United States Patent [19]

Kikinis et al.

[11] Patent Number: 5,590,382

[45] Date of Patent: Dec. 31, 1996

[54] PERSONAL DIGITAL ASSISTANT MODULE HAVING A MULTI-PORTION KEYBOARD WITH INDUCTIVE COUPLING

[75] Inventors: Dan Kikinis, Saratoga; Pascal Dornier, Sunnyvale; William J. Seiler, Scotts Valley, all of Calif.

[73] Assignee: Elonex IP Holdings Ltd., London, England

[21] Appl. No.: 286,126

[22] Filed: Sep. 20, 1994

Related U.S. Application Data

[63] Continuation-in-part of Ser. No. 144,231, Oct. 28, 1993, and Ser. No. 31,805, Mar. 15, 1993, Pat. No. 5,365,230.

[51] Int. Cl.⁶ .......................... G06F 13/00; G06F 19/00; H03M 11/00
[52] U.S. Cl. .......................... 395/893; 395/887; 341/32
[58] Field of Search ........................ 395/325, 800, 395/275, 425, 725, 155, 893, 887; 345/160, 169, 173, 168; 379/93, 96; 364/709.08, 708.1, 709.15; 320/21; 361/680; 400/479.2

[56] References Cited

U.S. PATENT DOCUMENTS

| | | | |
|---|---|---|---|
| 4,163,138 | 7/1979 | Harden | 200/310 |
| 4,375,922 | 3/1983 | Maegawa et al. | 400/70 |
| 4,534,012 | 8/1985 | Yokozawa | 395/275 |
| 4,545,023 | 10/1985 | Mizzi | 364/709.13 |
| 4,644,326 | 2/1987 | Villalobos et al. | 341/34 |
| 4,748,656 | 5/1988 | Gibbs et al. | 379/93 |
| 4,785,226 | 11/1988 | Fujisawa et al. | 320/21 |
| 5,029,183 | 7/1991 | Tymes | 375/1 |
| 5,157,585 | 10/1992 | Myers | 361/380 |
| 5,220,521 | 6/1993 | Kikinis | 364/709.08 |
| 5,278,958 | 1/1994 | Dewa | 395/275 |

*Primary Examiner*—Gopal C. Ray
*Attorney, Agent, or Firm*—Donald R. Boys

[57] ABSTRACT

A personal digital assistant module with a local CPU, memory, and I/O interface has a host interface comprising a bus connected to the local CPU and a connector at a surface of the personal digital assistant for interfacing to a bus connector of a host general-purpose computer, providing direct bus communication between the personal digital assistant and the host general-purpose computer. In an embodiment, the personal digital assistant also stores a security code. The personal digital assistant according to the invention forms a host/satellite combination with a host computer having a docking bay, wherein upon docking a docking protocol controls access by the host to memory of the personal digital assistant based on one or more passwords provided by a user to the host. In another embodiment the personal digital assistant also has an expansion port connected to the local CPU, and expansion peripheral devices may be connected and operated through the expansion port. In yet another embodiment, a full-sized re-geometrically reconfigurable keyboard is provided with cordless communication to the personal digital assistant.

9 Claims, 31 Drawing Sheets

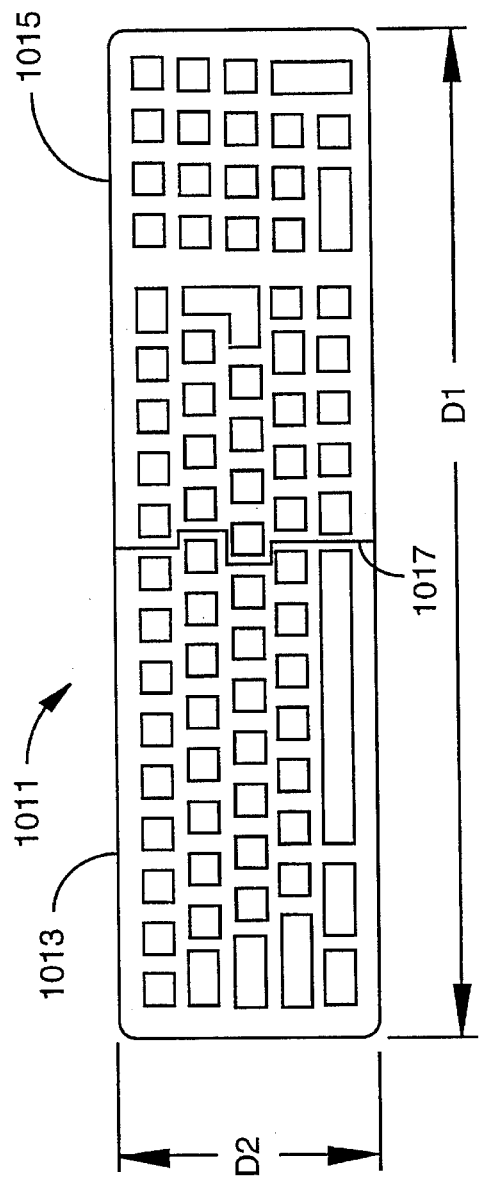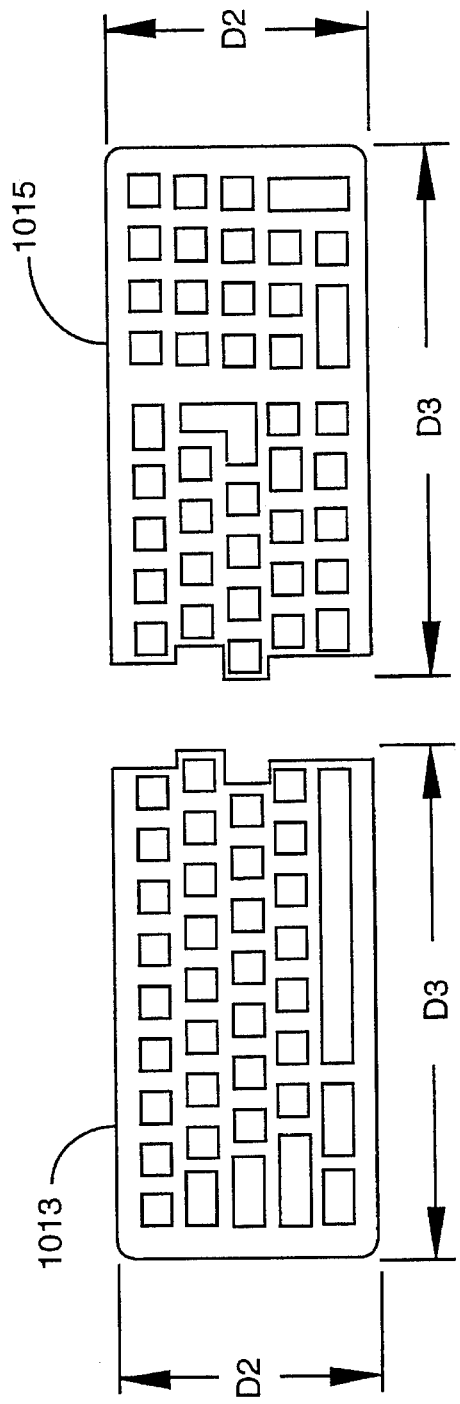
Fig. 21
Fig. 22

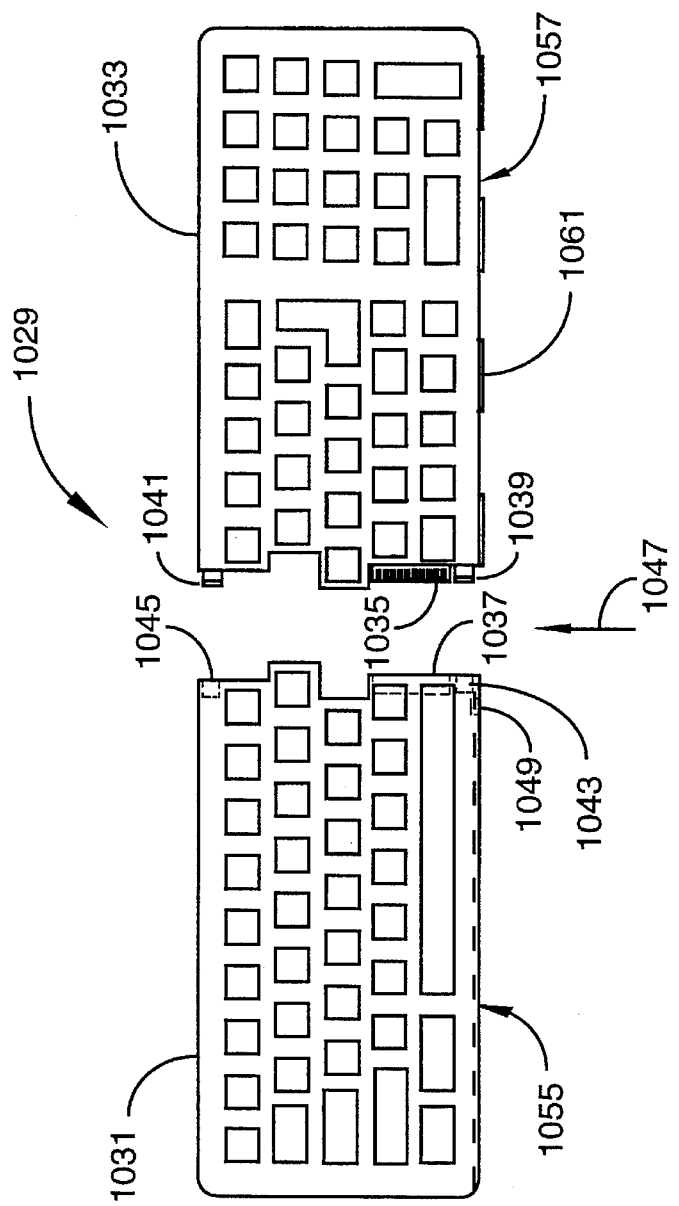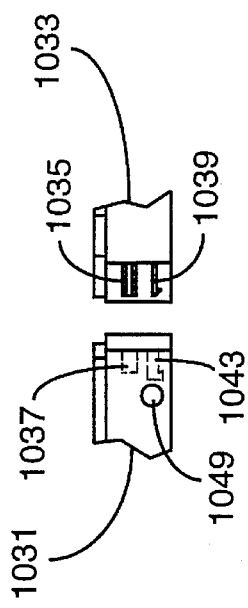
Fig. 26A
Fig. 26B

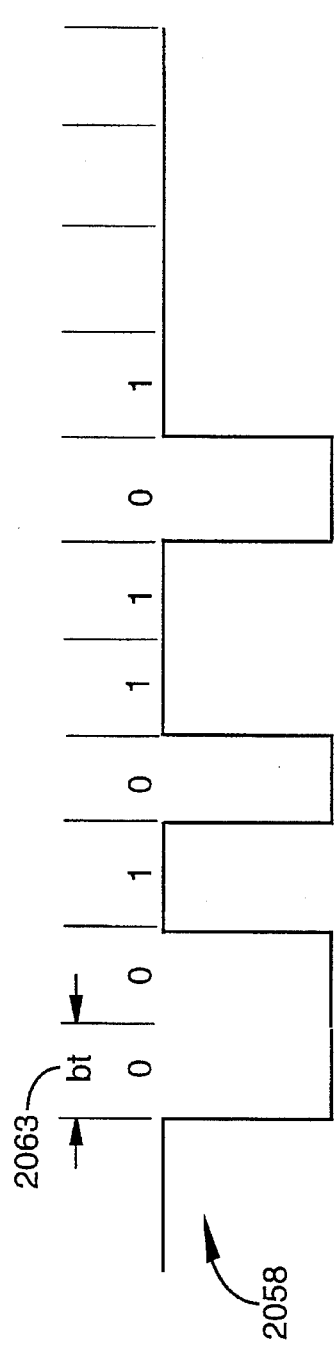
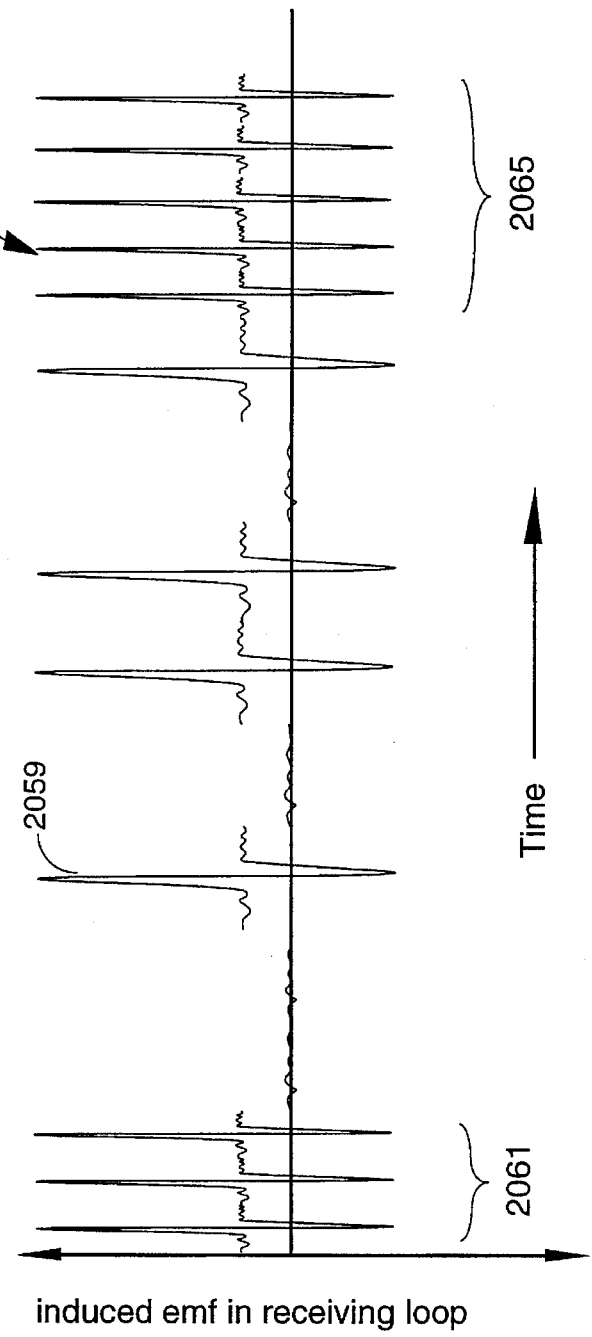
Fig. 32B
Fig. 32A
Time
induced emf in receiving loop

PERSONAL DIGITAL ASSISTANT MODULE HAVING A MULTI-PORTION KEYBOARD WITH INDUCTIVE COUPLING

CROSS-REFERENCE TO RELATED DOCUMENTS

This application is a continuation-in-part of application Ser. No. 08/144,231, filed Oct. 28, 1993, and of application Ser. No. 08/031,805, filed Mar. 15, 1993, now U.S. Pat. No. 5,365,230. It also contains substantially the disclosure of application Ser. No. 07/940,539, abandoned.

FIELD OF THE INVENTION

This invention is in the area of portable computers and pertains more specifically to small portable computing devices known in the art as personal digital assistants.

BACKGROUND OF THE INVENTION

Personal Digital Assistant (PDA) units, as of the date of this disclosure, enjoy a position of hope in the computer marketplace. Some believe this approach, a small, relatively inexpensive, and eminently portable computer unit, having software specifically written for tasks a user might expect to perform while travelling, will provide eminently useful and therefore salable computer products. Apple Computer, Hewlett Packard, and several other well-known computer manufacturers have made a considerable investment at no small risk in such systems.

Given the new systems now introduced, and those coming, for what is now known about them, there are still a number of drawbacks and problems. For example:

1. The PDA systems introduced are relatively costly, with starting prices ranging from several hundred dollars to two thousand dollars and more. At such prices, rivalling current pricing for desktop systems, the buying public may react negatively. It is true that prices will fall with increased manufacturing volume and competition, but the high end start may well be rejected by potential users.

2. The systems being offered are still relatively bulky, considering the limited range of tasks that may be accomplished. Most are certainly too big to be conveniently carried in a breast pocket. The Newton, manufactured by Apple Corporation, weighs about a pound and is approximately the size of a VHS video cassette.

3. A big drawback of the PDA systems being offered is the way they transfer data between a user's desktop unit, or other host, and the PDA. Known communication is by modem, by infrared communication, and by serial connection. These all require manipulation by a user, modulation on one or both ends of the communication path, and the like, which can be time-consuming, error-prone, and hardware extensive (expensive). Presently the Newton offers a modem and/or LED communication as an option, adding to the overall cost.

4. In known PDAs, software is typically recorded in ROM, so updating applications can be difficult, and sometimes impossible. This will be a problem because PDA users will not want the PDA to have the same capabilities at all times. Typical users will be people who travel and work while they travel. These users require different functions for a trip to Taiwan than for a trip to France, for example. What is needed is a quick and convenient means to update and substitute software.

5. Another difficulty is in the fact that the data files a user manipulates while travelling are typically data files also resident in a home unit, herein called a host unit, such as the user's office desktop machine or notebook or other portable computer. It is very troublesome to have two or more sets of critical data, with differences that one must remember to correct at an appropriate time. This can cause unending grief if files are not correctly updated. At best, current PDAs must use a relatively slow compressed bus to download and upgrade files. Typically this is done through a serial port, using a linking application like Laplink™.

What is needed is a small and inexpensive PDA that has a range of features that eliminate the above-described risks and problems. This new unit needs to be smaller than those presently being introduced, such as about credit-card size, or perhaps modeled on the PCMCIA type II or type III standard form factors. It should be inexpensive enough to produce that at least a minimum version could be sold in the roughly $100–$200 range, so it will be a unit seen to be a relatively inexpensive necessity. A PDA unit of this sort is the subject of the present invention, and is termed by the inventors a micro-PDA, or μPDA.

A very important feature of the μPDA in an aspect of the present invention is a direct parallel bus interface with a connector allowing the unit to be docked by plugging it into a docking bay in a host unit. Moreover, when the μPDA is docked in the host, there needs to be a means to effectively disable the CPU in the μPDA and to provide direct access to both the μPDA software and data storage by the host CPU. This direct access would provide immediate ability to communicate in the fastest available fashion between the μPDA and the host, and would also facilitate additional important features to be described below.

The μPDA also needs to have an optional compressed bus interface, including a connector separate from the host interface, so add-on devices may be utilized, such as a FAX modem, cellular communication, printer, and so on.

An additional feature that could be optionally provided in another aspect of the invention is an interface at the host to allow a user to select pre-arranged software mixes for loading to the μPDA. This feature comprises a set of control routines operating in conjunction with the host's display and input means, to allow the user to quickly select applications and perhaps data as well to be loaded to the μPDA satellite, to configure the smaller, more portable unit for specific itineraries and purposes.

Another desirable feature is an ability to automatically update data files. In this aspect of the invention, with the μPDA docked, data on the host, if carrying a later date and/or time stamp than the data on the μPDA, would be automatically updated on the μPDA and vice-versa. When one returns from an excursion using the μPDA and docks the satellite at the host, the host gains access, determines the location of the latest files, and accomplishes the update. This feature needs to have some built-in user prompting to be most effective. It makes the μPDA a true satellite system.

SUMMARY OF THE INVENTION

In a preferred embodiment of the invention a personal digital assistant module is provided comprising an enclosure for enclosing and supporting internal elements, a microcontroller within the enclosure for performing digital operations to manage functions of the personal digital assistant module, and a memory means connected to the microcontroller by a memory bus structure for storing data and executable routines. There is a power supply means within the enclosure for supplying power to functional elements of the personal digital assistant module, a display means operable by the microcontroller and implemented on a surface of the enclosure, and input means connected to the microcontroller for providing commands and data to the personal digital assistant module. A host interface means comprising a host interface bus structure, which may be configured as a PCMCIA bus interface, is connected to the microcontroller and to a first portion of a host interface connector at a surface of the enclosure, and the host interface means is configured to directly connect the microcontroller to a compatible bus structure of a host computer.

In one embodiment the personal digital assistant module has an expansion bus interface comprising an expansion bus structure connected to the microcontroller and to a first portion of an expansion bus connector for connecting the microcontroller to a peripheral device. A wide variety of peripheral devices are provided for use with the personal digital assistant of the invention.

In another aspect, the personal digital assistant module also has a nonvolatile storage device, such as an EEPROM connected to the microcontroller and containing one or more codes unique to the personal digital assistant, for uniquely identifying the personal digital assistant to digital devices connected on the host interface.

In a preferred embodiment, the display and input means for the personal digital assistant are configured as an overlaid touch screen and LCD display on a surface of the outer case of the personal digital assistant. A pointer device implemented as a thumbwheel in one embodiment and as a pressure sensitive pad in another is provided as part of the input capability.

The personal digital assistant module forms a unique combination with a general-purpose computer host having the personal digital assistant as a satellite unit. The host in this instance has a docking bay especially configured to dock the personal digital assistant, making a direct bus connection between the local CPU of the personal digital assistant and the CPU of the host. The host may be a desktop unit, a notebook computer, or a smaller portable like a palmtop computer. This combination provides power and convenience not before available.

Many other digital devices are also provided according to various aspects of the invention, such as modems, scanners, data acquisition peripherals, cellular phones, and a software vending machine, and all of these devices may be appended to the personal digital assistant by the expansion bus interface or, in many cases, by the host interface.

The personal digital assistant provided according to embodiments of the present invention is a unit more compact than conventional PDAs. It represents a new dimension in computer application and applicability, in a form promising to be eminently usable by and useful to almost everyone; and at a price easily affordable. It solves the communication problem intrinsic to personal digital assistants relative to larger and more powerful computers, with a unit that fits into a user's breast pocket, and at a very low price.

BRIEF DESCRIPTION OF THE DRAWINGS

FIG. 21 is a plan view of a two-part keyboard according to the invention shown assembled for use.

FIG. 22 is a plan view of the keyboard of FIG. 21 shown separated.

FIG. 26A is a plan view of a keyboard according to a preferred embodiment of the invention.

FIG. 26B is an elevation view of the interface area of the keyboard of FIG. 26A.

FIG. 32A is an exemplary trace of emf in a receiving loop according to an embodiment of the invention.

FIG. 32B is a serial digital scan code as reconstructed from the magnetically encoded code of FIG. 32A.

DESCRIPTION OF THE PREFERRED EMBODIMENTS

Figure 1A:
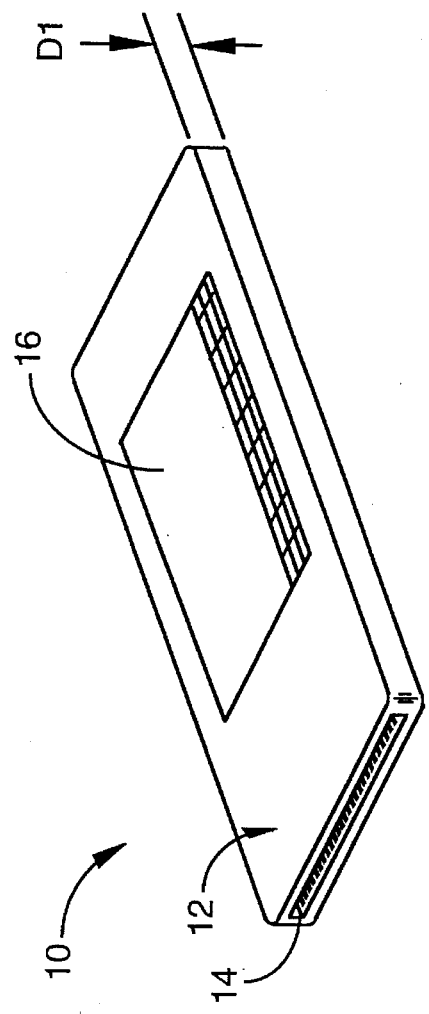
FIG. 1A is an isometric view of a µPDA according to an embodiment of the present invention.

FIG. 1A is an isometric view of a μPDA 10 according to an embodiment of the present invention. In this embodiment the unit is modeled on the PCMCIA standard Type II form factor, having a height D1 of about 5 mm. Body 12 is described in further detail below, and has a female portion 14 of a connector recessed at one end for engaging a mating male portion of the connector in a host computer, connecting the μPDA internal circuitry directly with a host internal bus. The host unit may be a notebook computer having a docking bay for the μPDA. Docking bays may be provided in desktop and other types of computers, and even in other kinds of digital equipment, several examples of which are described below.

Still referring to FIG. 1A, in this embodiment there is a combination I/O interface 16 implemented on one side of the μPDA, comprising a display overlaid with a touch-sensitive planar structure providing softkey operation in conjunction with interactive control routines operable on the μPDA in a stand-alone mode.

Although not shown in FIG. 1A, there may also be guides implemented along the sides of the case of the device for guiding the module in and out of a docking bay in a host computer unit. There may also be one or more mechanical features facilitating engagement and disengagement of the module in a docking bay.

Figure 1B:
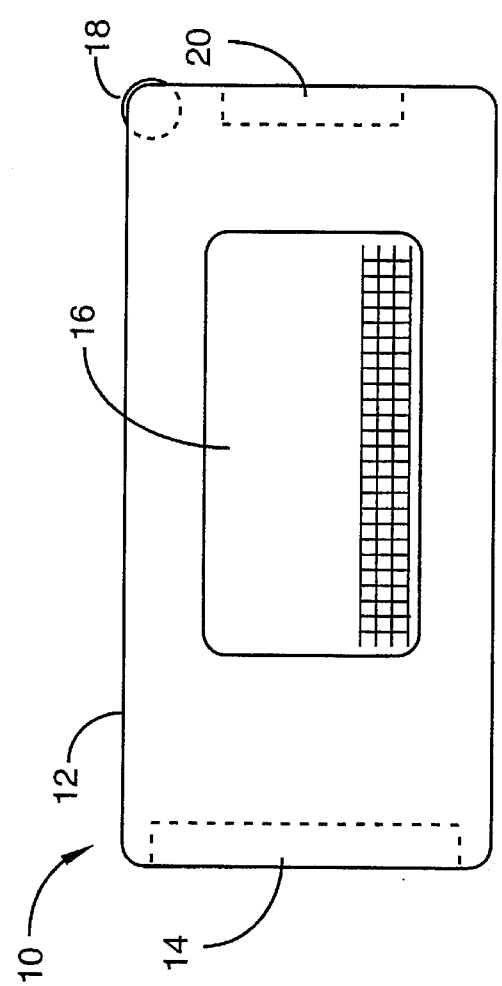
FIG. 1B is a plan view of the µPDA of FIG. 1A.

FIG. 1B is a top plan view of the μPDA of FIG. 1A, showing a thumbwheel 18 implemented in one corner of the μPDA. The thumbwheel in this embodiment is an input device capable of providing input with both amplitude and directional characteristics, and is some cases rate characteristics as well. The thumbwheel has many uses in combination with the μPDA and I/O interface 16. One such use is controlled scrolling of icons, characters, menus, and the like on the display of the device. The thumbwheel provides many of the functions of a pointer device.

In this embodiment of the μPDA a second external connector portion 20 is provided. This connector portion is for engaging peripheral devices as part of an expansion bus interface.

Figure 2:
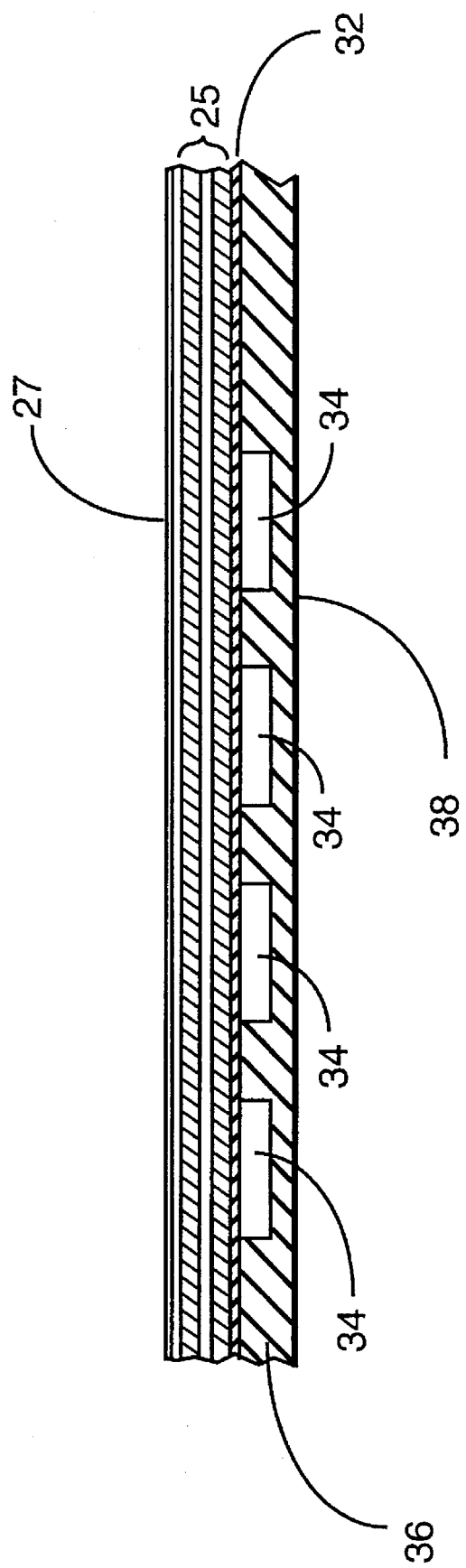
FIG. 2 is a cross-sectional view of the µPDA of FIGS. 1A and 1B.

FIG. 2 is a simplified cross-sectional view of a means for constructing a μPDA according to the present invention in a Type II PCMCIA, or other relatively small package. ICs 34 are encapsulated in a conformal material 36, and interconnection is accomplished by traces on a flexible polymer film 32 shown as overlaying the encapsulated structure. In this structure the ICs are not packaged in the conventional manner having solder leads for assembly to a printed circuit board. Rather, connections are made directly between the solder pads on the chip and the traces on the polymer film. Also there is no intention to relate ICs indicated by element No. 34 with specific functional ICs in a μPDA. This cross-section is illustrative of a method of construction only. It will be apparent to those with skill in the art that there are a number of polymer films that would be suitable, such as Kapton™ and others.

In this compact construction there may also be traces on the side of film 32 away from the interconnections for the CPU and memory for connection to other elements, such as display 25 and touch-sensitive screen 27.

LCD display 25 is implemented on one side of the μPDA, and touch-sensitive interface 27 is provided overlaying at least a portion of the LCD display. A metal casing 38, or other suitable material or combinations of material, surrounds the internal components and conforms to Type II PCMCIA form factors. This simplified cross-section illustrates some of the principles of construction that can allow the needed components to be inexpensively fitted into the small form factor needed. In another embodiment the μPDA is implemented in the form factor of a type III (10 mm thick) PCMCIA unit, using relatively conventional technology, such as PCB technology, rather than the encapsulated construction described immediately above. Various other constructions, form factors, and combinations are possible, as well.

Figure 3:
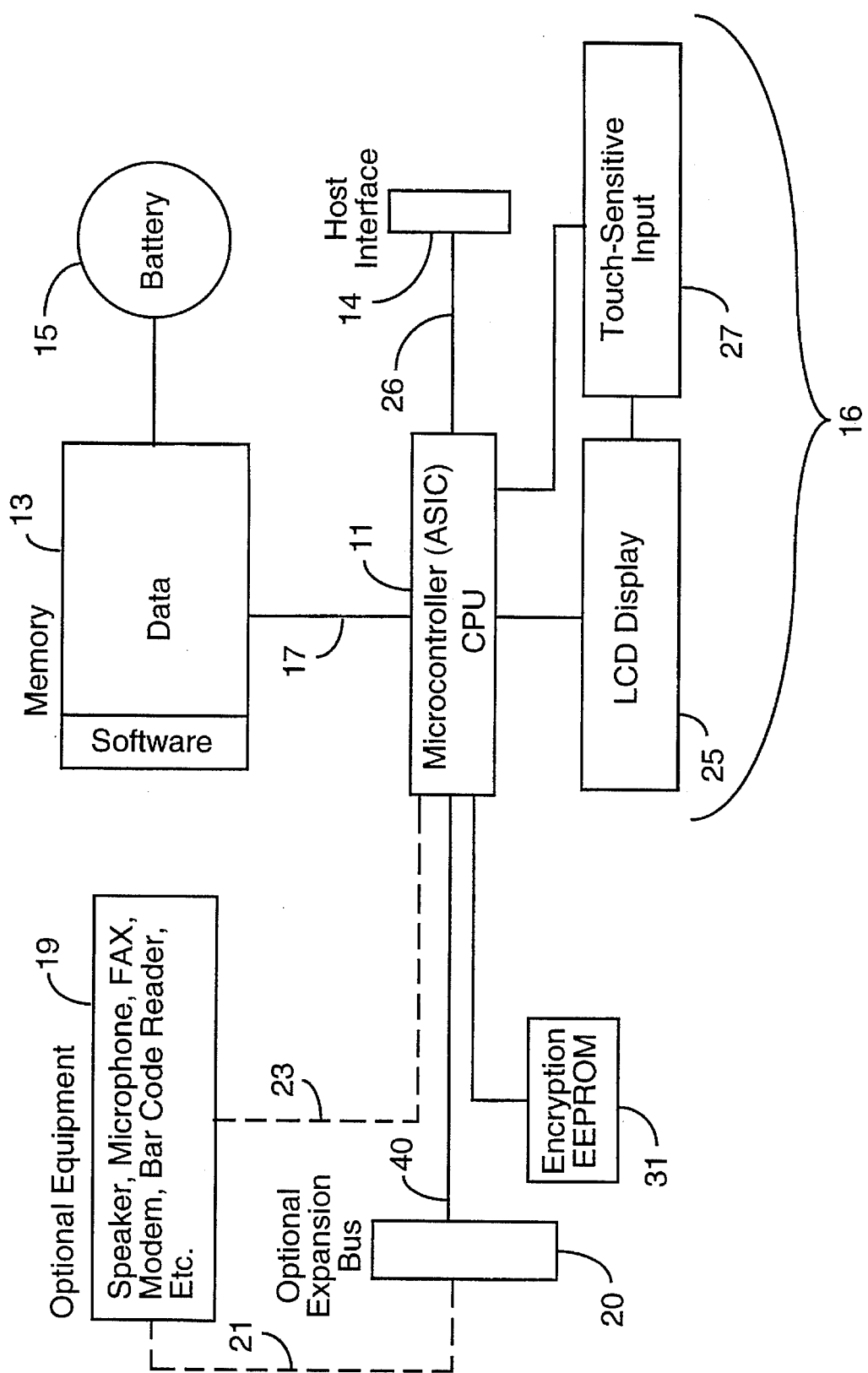
FIG. 3 is a block diagram of the µPDA of FIG. 1A and some peripheral elements.

FIGS. 3 is a simplified electrical block diagram of the μPDA of FIGS. 1A, 1B AND 2. A unique microcontroller 11 acts as the CPU of the μPDA in the stand-alone mode, that is, when the μPDA is not docked in a host unit. When the μPDA is docked in a host computer, microcontroller 11 acts as a slave unit, granting bus control to the CPU of the host. In docked mode, the CPU of the host thus gains control of the memory contents of the μPDA, subject in most cases to security procedures which are described below. Thus the host computer can transfer data and software into and out of a docked μPDA memory. In other embodiments many other cooperative operating modes may be accomplished between the two CPUs and accessible memory devices.

Memory 13 is preferably a nonvolatile device from 1 to 2 megabytes in this embodiment, and both control routines for applications and data files are stored in this memory. Memory 13 may be flash memory, CMOS ROM, CMOS RAM with battery, or a combination, with the software stored in ROM and the data in the flash memory. The memory device is interfaced to microcontroller 11 via a dedicated bus structure 17, and microprocessor 11 is configured to drive memory bus 17.

A battery 15 is the power source in the stand-alone mode, and may be recharged in one or more of several ways. The power traces are not shown in FIG. 3, but extend to all of the powered devices in the μPDA module. When the unit is docked in the host, the host power source may be connected to pins through the host interface to recharge the battery. Alternatively, an attached means such as a solar panel may be configured to charge the battery and/or provide power to the μPDA. A solar panel for power is described elsewhere in this disclosure. Also the battery may be easily removed for periodic replacement.

Host bus connector 14 is a part of a host interface which comprises a bus structure 26 for providing connection to the host in docked mode, as described above. In a preferred embodiment, the host interface is according to PCMCIA Type II, Rev. 3 standard, which is capable of communication either in PCMCIA mode or in a mode similar to PCI mode. PCI mode refers to a high-speed intermediate bus protocol being developed by Intel corporation, expected to become a standard bus architecture and protocol in the industry. The physical interface at the host in this embodiment is a slot-like docking bay, as is typical of know docking bays for PCMCIA devices. This docking bay may be implemented as a docking box, a built-in unit like a floppy-drive unit, or it may take some other form.

Connector portion 20 is a part of the expansion bus interface described above, comprising a dedicated bus structure 40 connected to microcontroller 11. This interface can be implemented in a number of different ways. The purpose of the optional expansion bus interface is to connect to optional peripheral devices, such as a printer, a FAX modem, a host cellular phone, and others. The expansion bus interface is not an essential feature in a minimum embodiment of the present invention, but provides vastly enhanced functionality in many embodiments.

The expansion interface can take any one of several forms. A preferred form is an extended enhanced parallel port and protocol based on an invention by the present inventors disclosed in a copending patent application. Another form is an indexed I/O port having 8-bit address and 8-bit data capability. The requirement of the expansion port is that the connection and communication protocol be compatible with expansion devices, such as telephone modems, fax modems, scanners, and the like. Many other configurations are possible.

Optional equipment such as devices listed in box 19 may be connected for use with the μPDA through the expansion bus. Selected ones of such devices may also be built in to the μPDA in various embodiments, providing variations of applicability. In the former case, connection is through path 21 and the expansion bus interface via connector portion 20. In the built-in case, connection is in the interconnection traces of the μPDA as indicated by path 23.

I/O interface 16 (also FIG. 1B) is for viewing μPDA application-related data and for touch-sensitive input via softkeys. By softkeys is meant assignment by software of various functions to specific touch sensitive screen areas, which act as input keys. Labels in I/O interface 16 identify functionality of the touch-sensitive areas in various operating modes according to installed machine control routines. LCD display 25 and the touch-sensitive area 27 together form the combination I/O interface 16 described also above.

In some embodiments of the present invention, data and program security is provided comprising an Electrically Erasable Programmable Read Only Memory (EEPROM) 31, which is connected by dedicated communication lines to microcontroller 11. EEPROM 31 holds one or more codes installed at the point of manufacturing to provide security for information transfer between a host and a μPDA. The purpose is to control access by a host to the memory contents of a μPDA, so each μPDA may be configured to an individual. To accomplish this, docking and bus mastering machine control routines are initiated at the point of docking, and this security process is described in more detail below. In other embodiments, security codes may be provided by a Read Only Memory (ROM) chip or other permanent or semi-permanent memory source.

Figure 4:
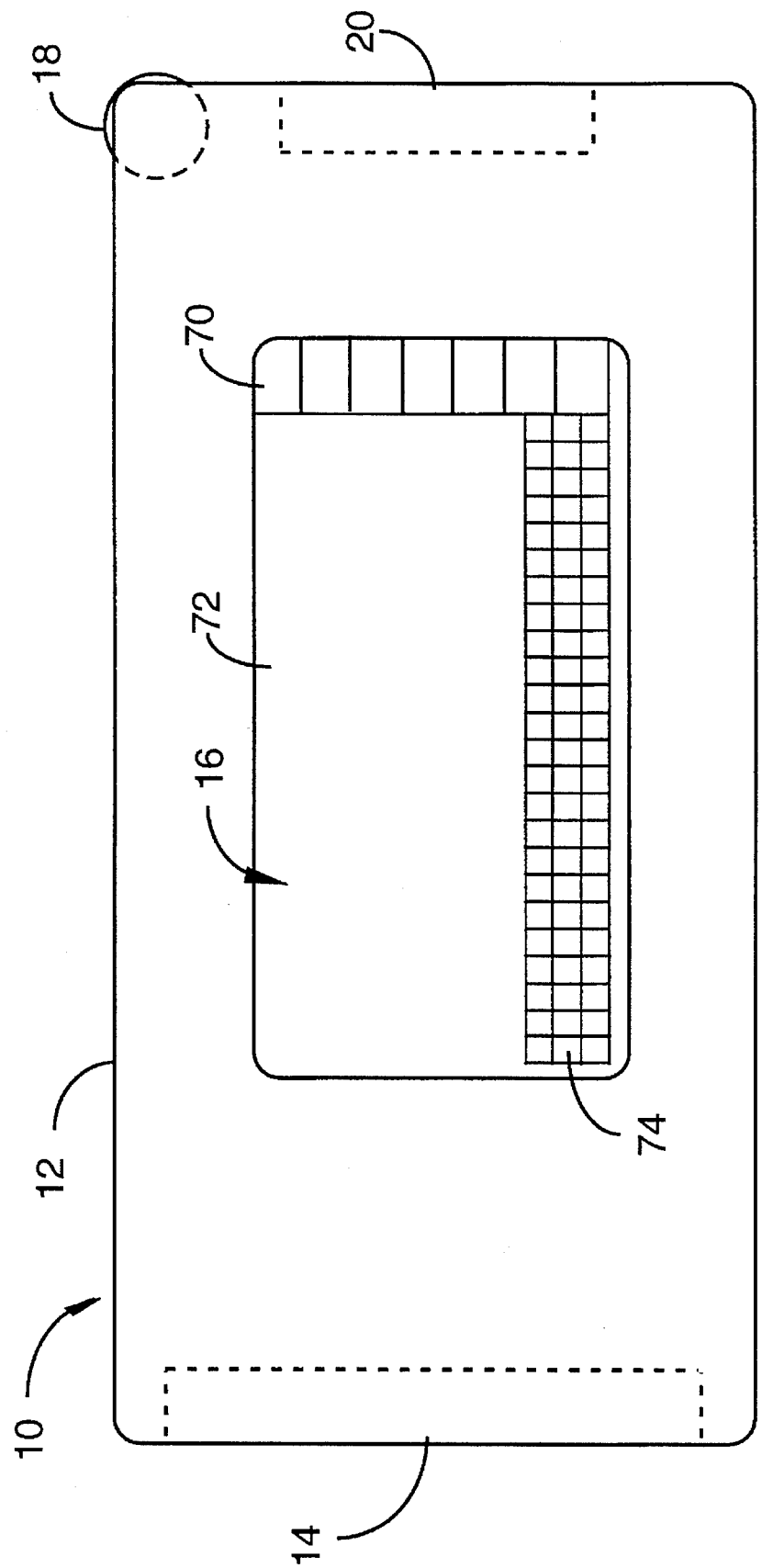
FIG. 4 is a more detailed plan view of the µPDA of FIG. 1A showing in particular an LCD display and touch screen user interface in an aspect of the present invention.

FIG. 4 is a plan view similar to FIG. 1B, of a μPDA, showing in particular I/O interface 16. The size and location of I/O interface 16 may vary, but in general occupies a major portion of one of the sides of the module. In one embodiment I/O interface 16 comprises an LCD display with a resolution of 256 by 144 pixels in a screen size that displays 32 by 12 characters. Each character in this embodiment is displayed in an area eight pixels wide and twelve pixels high. In another embodiment, the pixel resolution is 320 by 200, which corresponds to 40 by 16 characters.

The touch-sensitive areas of the touch-sensitive screen correspond to the character areas of the display. By touching an area with a finger or stylus, data can be entered quite quickly and with minimal CPU demand.

At one corner, thumbwheel 18 provides a two-directional means of controlling the configuration of the display according to installed control routines. A menu 70 is configured at one side to represent the current status of any application in progress and to provide appropriate user menu selections. In a preferred embodiment input from thumbwheel 18 is used for scrolling through menu 70, and active areas may be indicated by a cursor. A user makes a menu selection by pressing the appropriate touch-sensitive area. A specific input may be provided to cause the menu area to be displayed on either side of the display according to a user's preference.

Specific characters are displayed in this embodiment in a region 74, with each character area associated with a touch-sensitive input area. As region 70 dedicated to selectable characters is much too small to display all characters of a standard keyboard, input from thumbwheel 18 allows a user to pan region 74 displaying an entire virtual standard keyboard. Movement of thumbwheel 18 in one direction pans the character region horizontally, and movement in the other direction pans the character region vertically. When an end is reached the window pans onto the virtual keyboard from the other end. In this manner, a user may quickly pan the character window to display an entire standard keyboard, and make selections with a finger or a stylus. Of course, it is not required that a virtual keyboard be laid out for access in the format of a standard keyboard. Characters and punctuation, etc., could just as simply be displayed in a single strip along a region of the display, and scrolled by input from the thumbwheel or other pointer-type input device.

In this embodiment, to avoid delays caused by panning, if the thumbwheel is rotated quickly the character window jumps rather than scrolling to speed up the interface. In addition, menu 70 may optionally provide for a character display in different fonts and sizes, although a single font is preferred to minimize memory demand. It will be apparent to those with skill in the art that there are many alternatives for character selection and display, and many ways thumbwheel 18 may be configured to allow for scrolling and panning.

A document window 72 is provided in this embodiment at the top or bottom of I/O interface 16. A cursor locates the active position within the document for editing purposes. Menu 70 provides selection of available fonts, and input by thumbwheel 18 controls cursor movement over the document. As a document will in almost all cases be much larger than the display capability of region 72, it is necessary to pan the document window in essentially the same manner as the keyboard window is panned. For example, rotating thumbwheel 18 in one direction may display horizontal strips of a document, while rotating the thumbwheel in the opposite direction moves the window vertically strips of the same document.

A soft key or optional hard key may be configured to switch between the document and keyboard window, and the same or another key may be configured to switch between scrolling left or right, up or down, document or keyboard. A switch key may be used to change the thumbwheel mode of operation. A switch key may also be used in combination with a floating pointer to select characters and menu items. In this embodiment, the user can keep his or her hands relatively stationary on just the thumbwheel and the switch key, making all possible selections. Use of a switch key in combination with a floating pointer facilitates the use of small fonts. A switch key may also be incorporated as an additional hard key in a convenient location on the case 12.

It will be obvious to a person skilled in the art than there are numerous ways to combine menu selections, switching keys and I/O configurations to provide a user-friendly user interface. A further embodiment of the present invention provides an I/O set-up application wherein a user may completely customize features of I/O area displays.

There are other sorts of mechanical interfaces which may be used to provide pointer-style input in different embodiments of the invention as alternatives to the thumbwheel disclosed. One is a four-way force-sensitive mouse button and a selector button, which may be located at opposite ends of case 12 below I/O interface 16. Each button is designed to be operated by one finger. The four-way force-sensitive mouse button can provide menu scrolling of a cursor and panning and/or indexing of keyboard and document windows, while the selector button is used to select and edit according to position of a cursor. This configuration minimizes hand movement and keeps the I/O area clear for viewing.

Implementation of thumbwheels, pressure-sensitive switches and buttons, and the like, are known in the art, including the translation of mechanical motion and pressure to electrical signals and provision of such signals to a microcontroller. For this reason, details of such interfaces are not provided in this disclosure. Combinations of such inputs with displays and input areas may, however, be considered as inventive.

Figure 5:
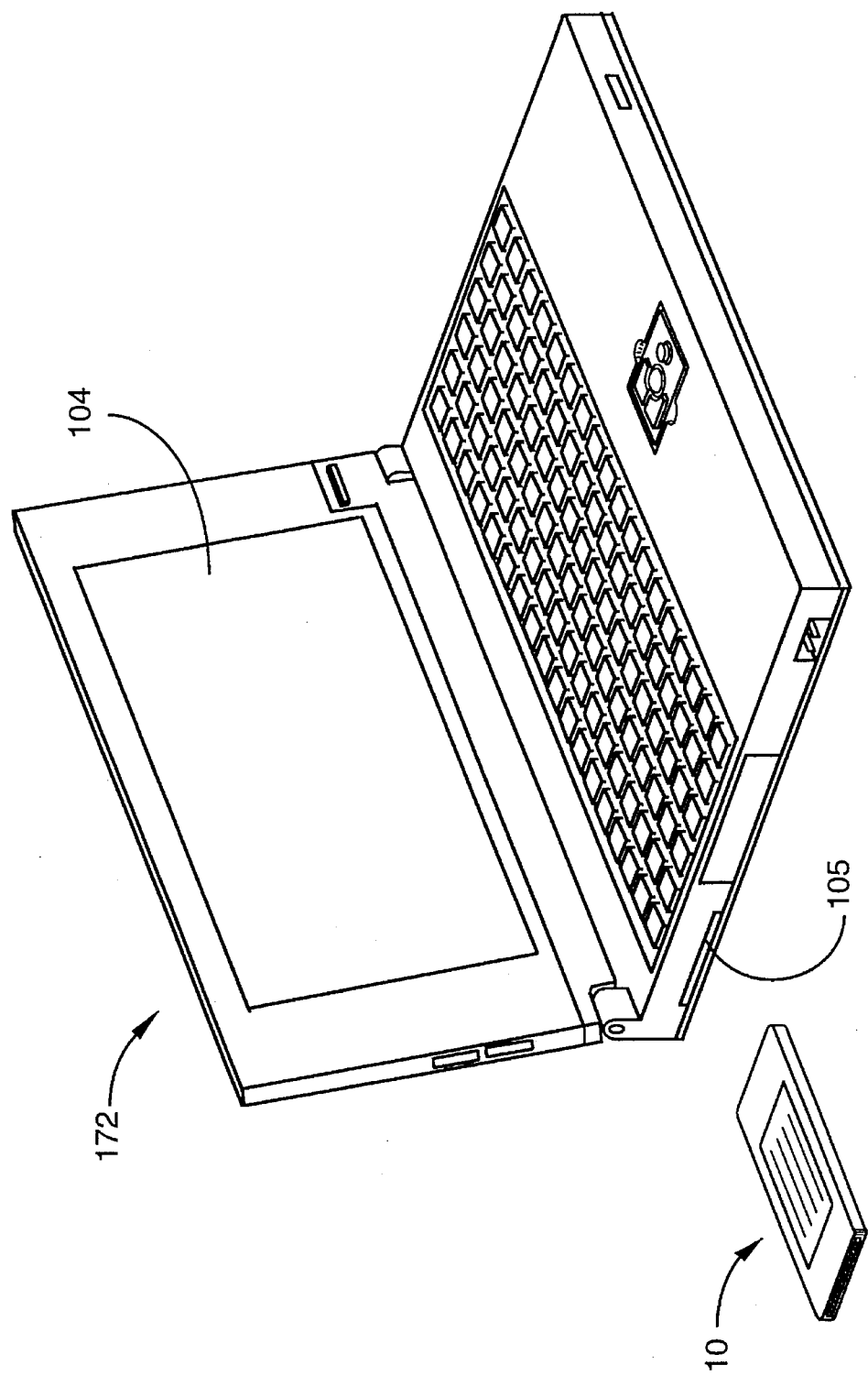
FIG. 5 is an isometric view of a µPDA and a host notebook computer in an aspect of the present invention, with the µPDA about to be docked in a docking bay of the notebook computer.

FIG. 5 is an isometric drawing of a µPDA 10 in position to be docked in a notebook computer 172 via a Type II PCMCIA docking port 105 according to an embodiment of the present invention. As further described below, once the µPDA is docked, it is activated and a procedure is initiated with the host computer to manage communication and verify memory access rights (security).

Access rights are considered important by the inventors for a number of reasons. Firstly, through the expedient of one or more specific codes, unique to each µPDA, a user may protect files stored in his module from access by unauthorized persons. The code can be used both to control access to data and files via I/O interface 16, and also through the host bus interface, so data and files may be secure from access by an unauthorized host system.

In the former case, when a µPDA is powered up, an application routine can query the user for an access code to be entered at I/O interface 16 FIG. 4). If the code is not entered properly, access is denied, and power goes off. Codes for the purpose are stored in EEPROM 31 (FIG. 3), or in whatever ROM device may be devoted to the purpose. In some embodiments, the code may by mask-programmed at manufacture, so it is not alterable. In others, the code may be accessible and changeable by special procedures in the field.

In the case of host communication, it is possible that a portable or desktop computer, or some other device, may have a docking port physically configured to receive a µPDA, yet not be configured to communicate with the µPDA. This certainly might be the case where the µPDA is in the PCMCIA form. For purposes of disclosure and description, this specification terms such a unit a generic host. If the unit is configured to communicate with a µPDA it is an enabled host. If a host is configured for full access to a particular µPDA, it is a dedicated host.

If a docking unit is a generic host, there will be no communication unless the person presenting the µPDA provides the control routines to the host. This may be done for a generic host such as by transfer from a floppy disk, from a separate memory card through the docking port, or, in some embodiments, the communication software may be resident in memory 13 (FIG. 3) of a docked µPDA, transferrable to the host to facilitate further communication.

If the docking unit is in fact an enabled host, or is configured after docking to be an enabled host, the stored code or codes in EEPROM 31 (or other storage unit) may be used to verify authorization for data and program transfer between the host and a µPDA. In one embodiment this procedure is in the following order: First, when one docks a µPDA in a compatible docking port, certain pin connections convey to both the µPDA microcontroller and to the host CPU that the module is docked. Assuming an enabled host, the fact of docking commences an initialization protocol on both systems.

In most embodiments, if the docking unit is a non-host, that is, it is not capable of communication with the docked module, nothing happens, and the user may simply eject the docked module. If the computer is an enabled host, an application is started to configure host access to the µPDA's data files through the µPDA microcontroller. A user interface, described more fully below for a particular embodiment, is displayed on the host monitor 104 (FIG. 5). The host interface menu, as well as other application menus, may be formatted in part as a display of the µPDA I/O-interface 16 as seen in FIG. 4 and described in accompanying text. In some embodiments, the docked µPDA can be operated in situ by manipulating the input areas of the µPDA displayed on the host's screen.

If the host is not a home unit for the docked module, that is, the host does not have matching embedded ID codes to those stored in the docked module, a visitor protocol is initiated. In this event, a visitor menu is displayed on host display 104 for further input, such as password queries for selections of limited data access areas in the docked module. In this case, too, a user may gain full access to the docked module's memory registers by entering the proper password(s).

If the host is a fully compatible host home unit, full access may be immediately granted to the host to access memory contents of the docked module, including program areas; and both data and programs may be exchanged.

In any case, when the µPDA is ejected or otherwise removed from the docking port, the on-board module microcontroller again gains full control of the internal µPDA bus structures.

Figure 6:
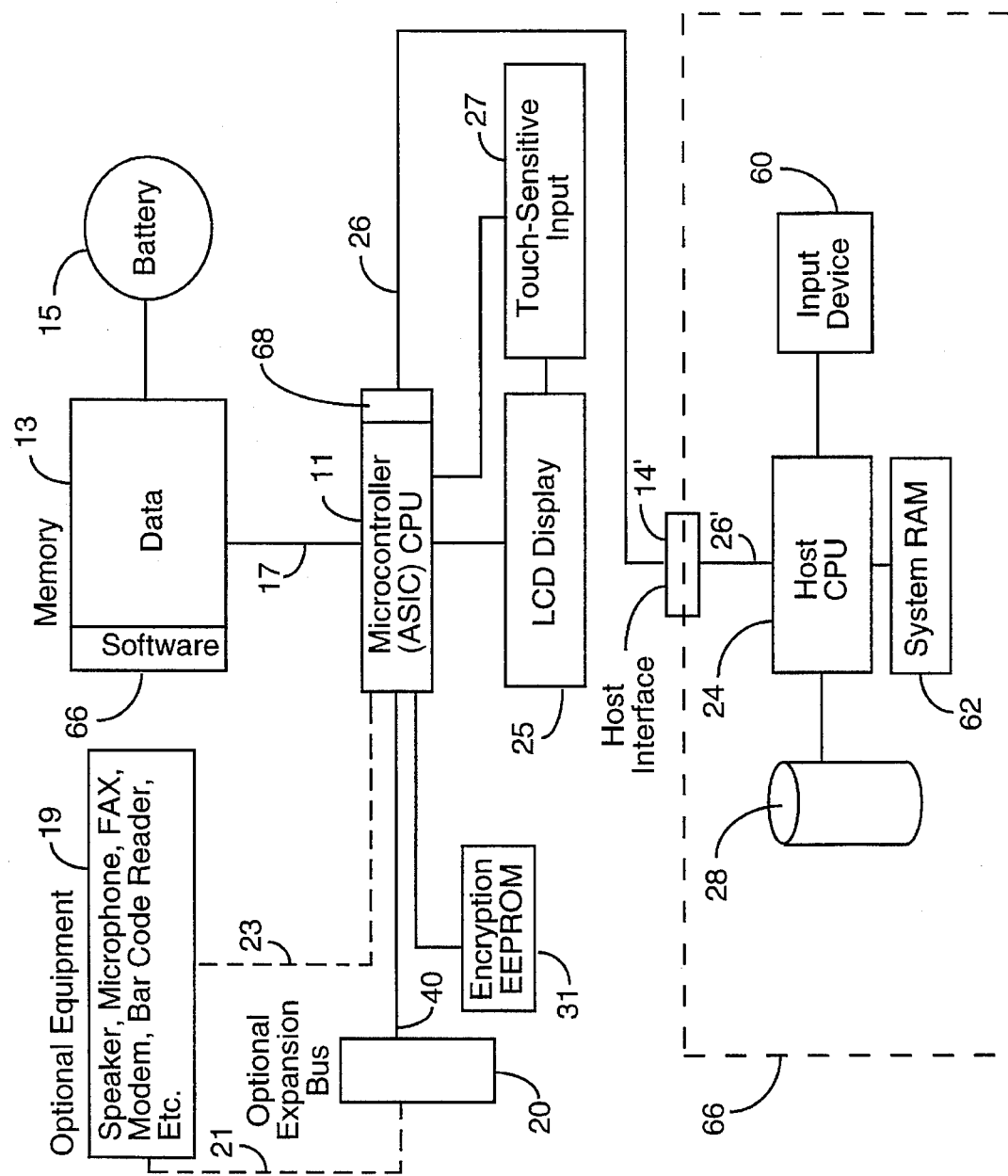
FIG. 6 is a block diagram of a µPDA docked in a docking bay of a host computer according to an embodiment of the present invention.
Figure 7:
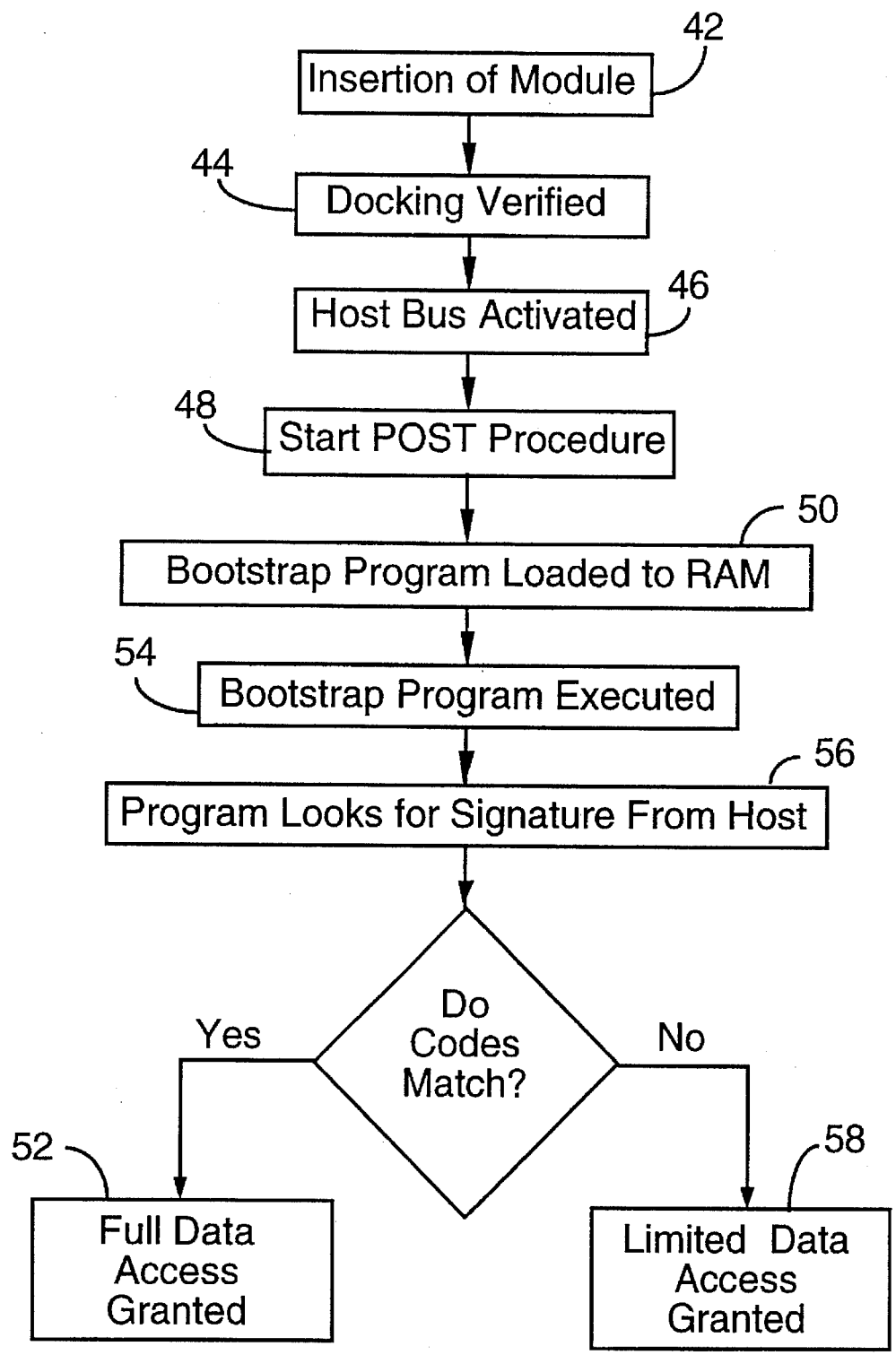
FIG. 7 is a logic flow diagram of the steps in docking a µPDA in a host computer according to an embodiment of the present invention.

FIG. 6 is a simplified block diagram of a µPDA docked in a host computer, and FIG. 7 is a basic logic flow diagram of the steps involved in docking a µPDA in a host computer 66 according to an embodiment of the present invention. Host computer 66 is represented in a mostly generic form, having a host CPU 24, and input device 60, such as a keyboard, a mass storage device 28, such as a hard disk drive, and system RAM 62. It will be apparent to those with skill in the art that many hosts may have a much more sophisticated architecture, and the architecture shown is meant to be illustrative.

When a μPDA unit is docked, connector 14' in FIG. 6 comprises portion 14 shown in FIGS. 1B and 3 and a mating connector portion for engaging portion 14 in port 105 (FIG. 5). The engagement of the separate portions of the connector cause bus 26 in the μPDA and bus 26' in the host to become directly connected. There is then a direct bus path between microcontroller 11 and host CPU 24 (FIG. 6).

As previously described there is a pin configuration (not shown) in connector 14 dedicated to signalling that a module is docked. In FIG. 7, step 42 represents insertion of a μPDA module into the docking port. At step 44 the signalling pin configuration signifies physical docking is accomplished. At step 46 host interface bus 26 is activated, including the mated host bus 26' in the host.

At step 48 (FIG. 7) microcontroller 11 in the μPDA starts a preprogrammed POST procedure. Microcontroller 11 in this embodiment has a page of RAM 68 implemented on the microcontroller chip. In other embodiments RAM may be used at other locations. At step 50, the POST routine loads a bootstrap program to RAM 68, which includes a code or codes for security matching. This code or codes comprise, for example, a serial number.

At step 54 the bootstrap program begins to execute in microcontroller 11, and at step 56 the microcontroller looks for a password from the host on host interface bus 26 (FIG. 6).

The fact of docking, assuming an enabled or dedicated host, also causes a communication routine, which may be accessed from, for example, mass storage device 28 at the host, to display a user interface on monitor screen 104 of the host unit, as partly described above. It is this communication program that makes a generic host an enabled host.

Assuming an enabled, but not dedicated, host, the user interface will query a user for input of one or more passwords, after successful entry of which the host will pass the input to microcontroller 11 for comparison with the serial number and perhaps other codes accessed from EEPROM 31 in the bootstrap of the μPDA.

According to the codes passed from the host to the docked module, microcontroller 11 will allow full access to memory 31 at function 52, FIG. 7, for the host CPU, or limited access at some level at function 58, defined by received codes (or no matching code at all).

The access protocols and procedures allowing partial or direct access to μPDA memory 13 are relatively well known procedures in the art, such as bus mastering techniques, and need not be reproduced in detail here. In addition to simple comparison of codes, there are other techniques that may be incorporated to improve the integrity of security in the communication between a μPDA and a host. For example, within the limitation of storage capacity of the EEPROM or other nonvolatile source, executable code might also be uploaded to onboard RAM 68, or code keys to be used with executable code from other sources, or relatively simple maps re-allocating memory positions and the like, so each μPDA may be a truly unique device.

There are additional unique features provided in one aspect of the invention as part of the communication routines introduced above. One such feature is automatic updating and cross-referencing of existing files and new files in both computers, under control of the host system, with the host having direct bus access to all memory systems. Auto-updating has various options, such as auto-updating by clock signature only, flagging new files before transfer, and an editing means that allows the user to review both older and newer versions of files before discarding the older in favor of the newer. This automatic or semiautomatic updating of files between the satellite and the host addresses a long-standing problem. The updating routines may also incorporate a backup option to save older files.

Another useful feature in host/μPDA communication is a means for a user to select and compose a mix of executable program files for downloading to a μPDA, either replacing or supplementing those executable routines already resident. A user can have several different program lists for downloading as a batch, conveniently configuring the applicability of a μPDA among a wide variety of expected work environments.

Such applications as databases, spreadsheets, documents, travel files such as currency converters, faxing and other communications programs, time clocks, address and telephone records, and the like, may comprise customized lists of user-preferred applications.

In another embodiment, an undocked μPDA can transfer data via the optional expansion bus 40 (FIG. 3) directly to a host. In the special case of a μPDA user without access to a PCMCIA interface on his host (notebook or desk-top) computer, he or she can connect to a host via an auxiliary port on the host, such as a serial port, via the expansion bus interface. In this case, the μPDA still requests password(s) from the host, and controls access to its on-board memory according to the password(s) received.

The optional expansion interface may also be used in some embodiments while a μPDA is mastered by a host, wherein the host may effectively send data through the bus structures of the μPDA.

Additional Aspects and Features

Software Vending Machine:

In a further aspect of the invention, a Software Vending Machine with a very large electronic storage capacity is provided, wherein a μPDA user may dock a module and purchase and download software routines compatible with the μPDA environment.

Figure 8:
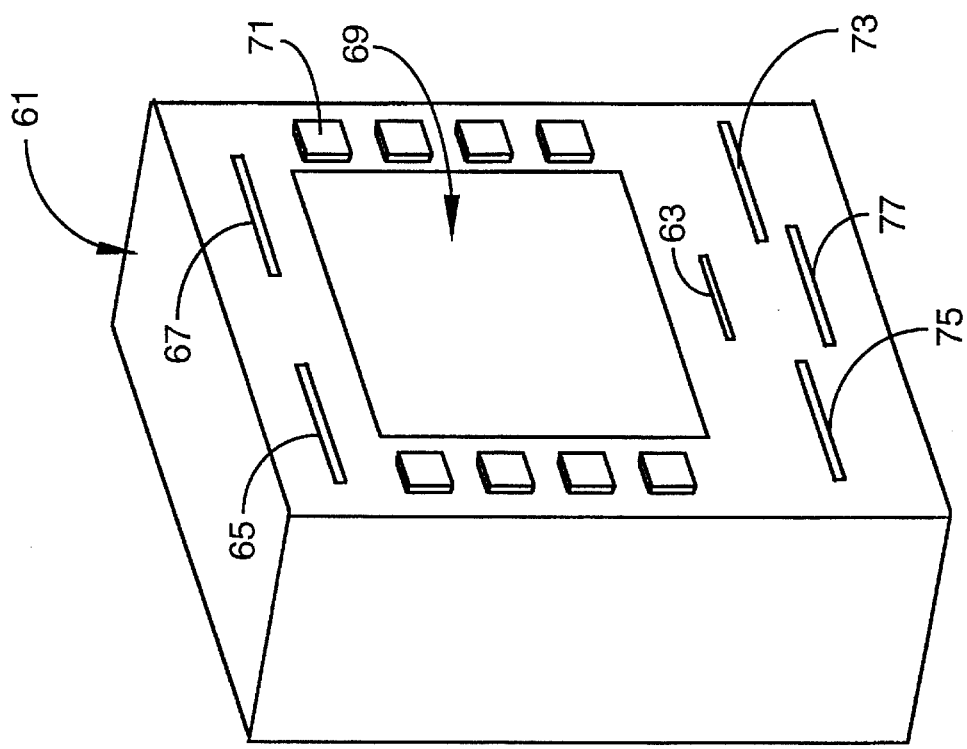
FIG. 8 is an isometric illustration of a µPDA software vending machine in an aspect of the present invention.

FIG. 8 is an isometric view of such a vending machine 61 having a docking bay 63 for a μPDA, a credit card slot 65, and a paper money slot 67. A display 69 provides a user interface for reviewing and purchasing software from the vending machine, along with selector buttons such as button 71 along the sides of the display. In an alternative embodiment the display may also have a touch screen, and may, in some embodiments, emulate the μPDA I/O area on a larger scale.

In operation, a user may, in this embodiment, review software for sale simply by docking his μPDA unit in the vending machine and selecting from a menu on display 69. The menu may allow the user to browse all available applications, or list new applications since entered dates. The user can select certain applications, try them out, at least in simulation, and then select applications to purchase.

The vending machine, once all the requirements are met, such as proper identification and payment, copies the selected application(s) to the memory of the μPDA, or, alternatively, to a floppy disk provided by either the user or the vending machine. In this case there is also a floppy disk drive 73 in the vending machine and a port 75 for dispensing formatted floppies for a customer to use in the disk drive. This mode is useful for the instances where a user's μPDA is loaded beyond capacity to receive the desired software, or the user simply wishes to configure the software mix himself from his or her own host computer.

There may also be provided a backup option so a user may instruct the vending machine to read and copy all or a selection of his files to one or more floppy disks before installing new files or data.

As described above, each user's μPDA includes an EEPROM or other storage uniquely identifying the μPDA by a serial number or other code(s), so the vending machine may be configured in this embodiment to provide the software in one of several modes.

A user may buy for a very nominal price a demo copy of an application, which does not provide full capability of the application, but will give the user an opportunity to test and become familiar with an application before purchase. Also, the user may buy a version of the same application, configured to the ID key of the μPDA to which it is loaded, and operable only on that μPDA. In another embodiment, the software is transferable between a family of keyed μPDAs, or has the ability to "unlock" only a limited number of times. In these cases, the applications would be sold at a lesser price than an unlocked version. The unlocked version works on any μ-PDA and/or host/μPDA system. The higher price for the unlocked version compensates for the likelihood of unauthorized sharing of the vended applications.

The vending machine could also offer a keyed version, customized to operate only on the μPDA docked in the software vending machine, or upon a family of μPDAs. This keyed version is possible because of the individual and unique nature of each μPDA, which has, at a minimum, a unique serial number, and may also have other security programming, as described above, which allows a vending machine to prepare and download a customized copy of an application that will operate only on the particular module for which it is purchased.

There are a number of different means by which unique correspondence might be accomplished, as will be apparent to those with skill in the art. A standard version stored in the memory facility of a vending machine might be recompiled, for example, on downloading, using a unique code from the docked or identified μPDA as a key in the compilation, so only the specific μPDA may run the program by using the same unique key to sequence the instructions while running. The key for scrambling or otherwise customizing an application might also comprise other codes and/or executable code sequences stored uniquely in a μPDA.

In yet another aspect related to the vending machine, there is a printer outlet 77 which prints a hardcopy manual for the user. It is, of course, not necessary that the software vended be specific to the M-PDA. Applications may also be vended for other kinds of machines, and transported in the memory of the μPDA, or by floppy disk, etc. In this embodiment a non-μPDA user can acquire a wide assortment of software.

The software vending machine may also serve as an optional informational display center in such locations as airports, train stations, convention centers, and hotels. Upon inserting a μPDA a user may interface directly and upload current information including, but not limited to, local, national, and world news; stock quotes and financial reports; weather; transportation schedules; road maps; language translators; currency exchange applications; E-mail and other direct on-line services.

A customized vending machine could be tailored to business travelers and allow fast access to pertinent information, allowing the user to download files to send via E-mail. In another aspect of the invention, the vending machines are linked to each other allowing users to send messages to associates travelling through locations of associated vending machines. Such dedicated μPDA E-mail is immediately downloaded to a specific μPDA as it is docked. The sender may have the associate's μPDA unique encoded key as identification, or some other dedicated identifying means for E-mail.

In another embodiment, as each business associate arrives at an airport, he or she may prompt the custom vending machine in that location via an optional installed infrared interface (not shown) in their μPDA. The custom vending machine, also equipped for infrared communication, receives the signal and sends/or receives any messages that are waiting.

Figure 9:
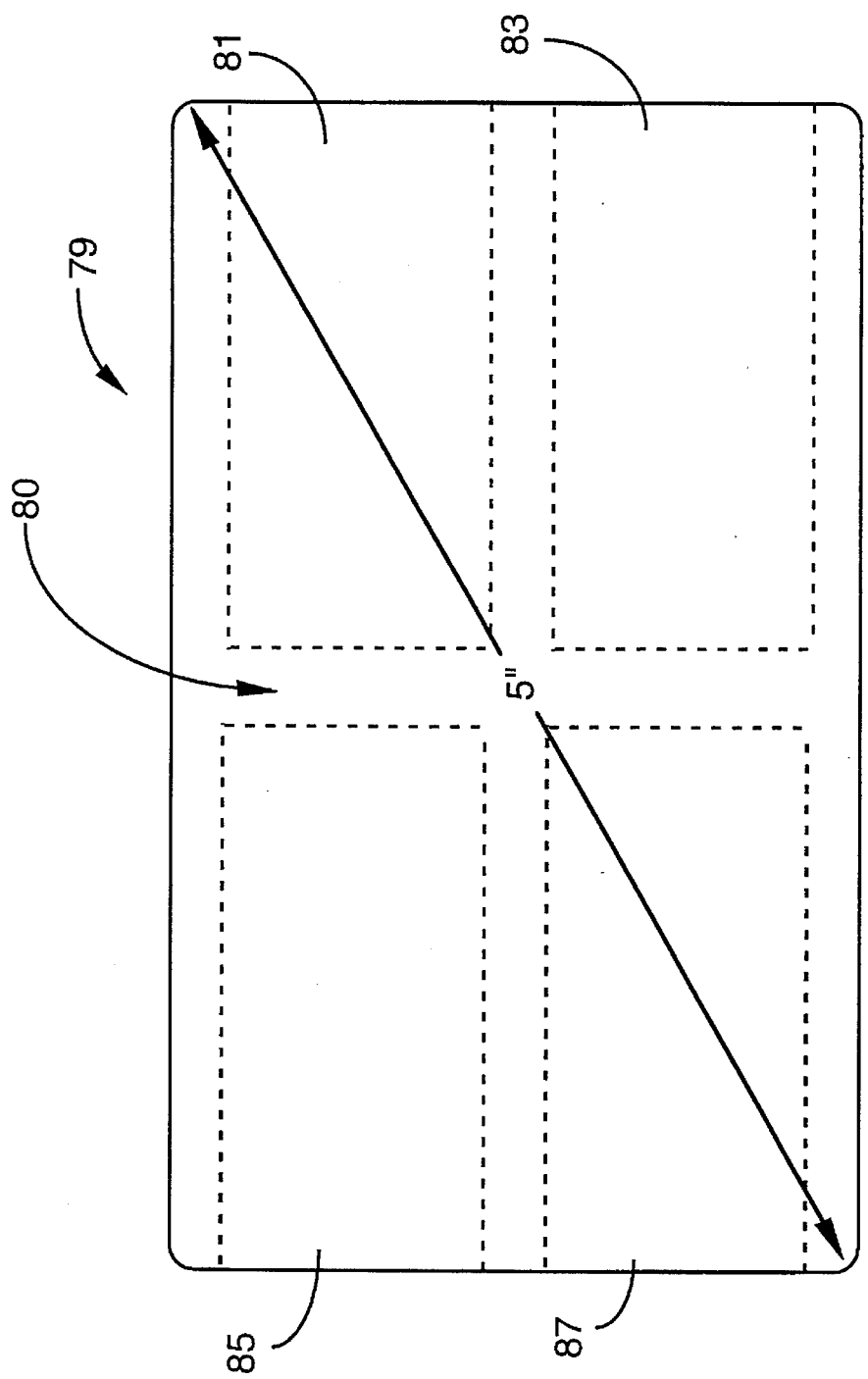
FIG. 9 is a top plan view of a µPDA enhanced user interface according to an embodiment of the present invention.

Enhanced Display:

FIG. 9 is a plan view of an enhanced I/O interface unit 79 according to an aspect of the present invention. Interface unit 79, with about a 5-inch diagonal measurement, comprises a combination LCD display at least partially overlaid by a touch-sensitive input screen, providing an I/O area 80 in much the same manner as in a μPDA. Four docking bays 81, 83, 85, and 87 are provided in the left and right edges of interface unit 79 in this embodiment, and are configured for PCMCIA type II modules. One of these bays may be used for docking a μPDA according to the present invention, and the other three to provide a larger CPU, additional memory, battery power, peripheral devices such as modems, and the like by docking functional PCMCIA modules.

Interface unit 79 is a framework for assembling a specialty computer through docking PCMCIA units, including a μPDA according to the present invention. In other embodiments where the μPDA assumes other form factors, the docking bays may be configured accordingly.

A docked μPDA in this embodiment is configured to produce its I/O display on I/O area 80. The thumbwheel on the M-PDA is accessible while docked and acts as described above in the stand-alone mode in this case. In another aspect, the enhanced display has a re-configured output that enables the user to manipulate the data from the touch-screen alone and/or additional hardware selector buttons and/or a standard keyboard attached to the enhanced display via a dedicated bus port, or even through the expansion port of a docked μPDA. In a further embodiment the enhanced display has a dedicated mouse port and/or a dedicated thumbwheel.

In yet another embodiment, interface unit 79 has an inexpensive, conventional, replaceable battery and/or a rechargeable battery. Also, in another aspect, interface unit 79 may dock two or more individual μPDAs and cross-reference data files between them according to control routines that can manipulate mutually unlocked files. Further still, interface unit 79 may be placed and structurally supported for easy viewing on a dedicated standard or smaller-sized keyboard, connecting to the keyboard as an input device. The keyboard would then automatically serve as the input device.

Interface unit 79 for a μPDA is small and compact enough to slip into a pocket book or briefcase, providing a very portable, yet very powerful, computer.

Figure 10:
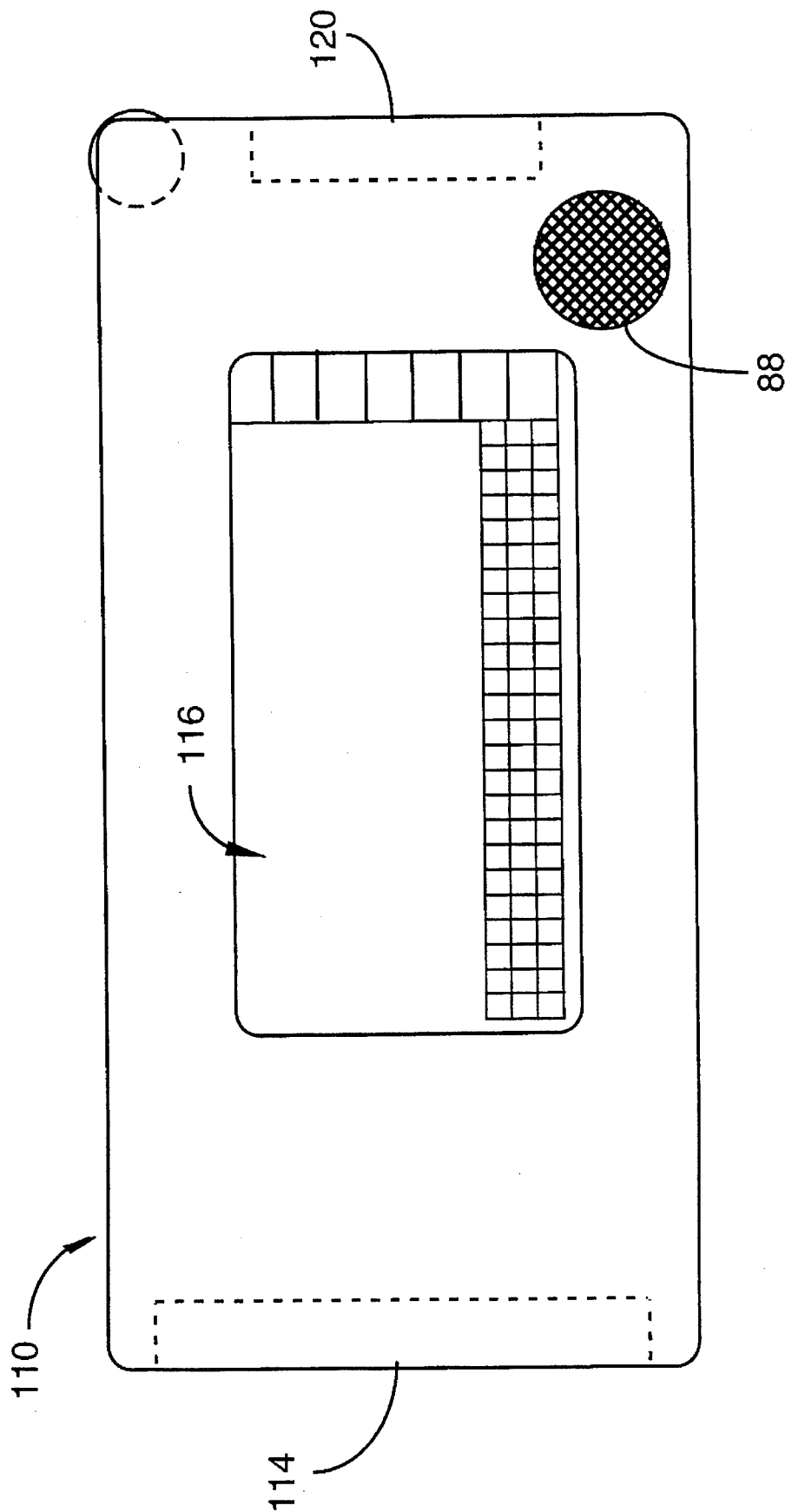
FIG. 10 is a top plan view of a µPDA with a microphone in an embodiment of the present invention.

Microphone/Voicenotes:

FIG. 10 is a plan view of a μPDA 110 with an I/O interface 116, an expansion port 120, and a host interface connector 114. μPDA 110 has all the features previously described and additionally a microphone 88. In this embodiment, control routines in the μPDA use a linear-predictive coding (LPC) approach to convert analog input from the microphone to a digital voice recording. This approach uses a minimum of memory, but still is capable of reproducing audio input like the human voice within recognizable limits.

In an alternative embodiment, for better quality voice recording, a two-step integrator may be used in order to separate the analog signal and synthesize a closer digital representation.

With a μPDA so configured, a user's voice notes can be recorded and later uploaded to a host for processing. In future embodiments the digital signals may be converted to text or sent as voicemail on a network. In yet another embodiment, the microphone is integrated with a speaker for editing purposes.

Figure 11:
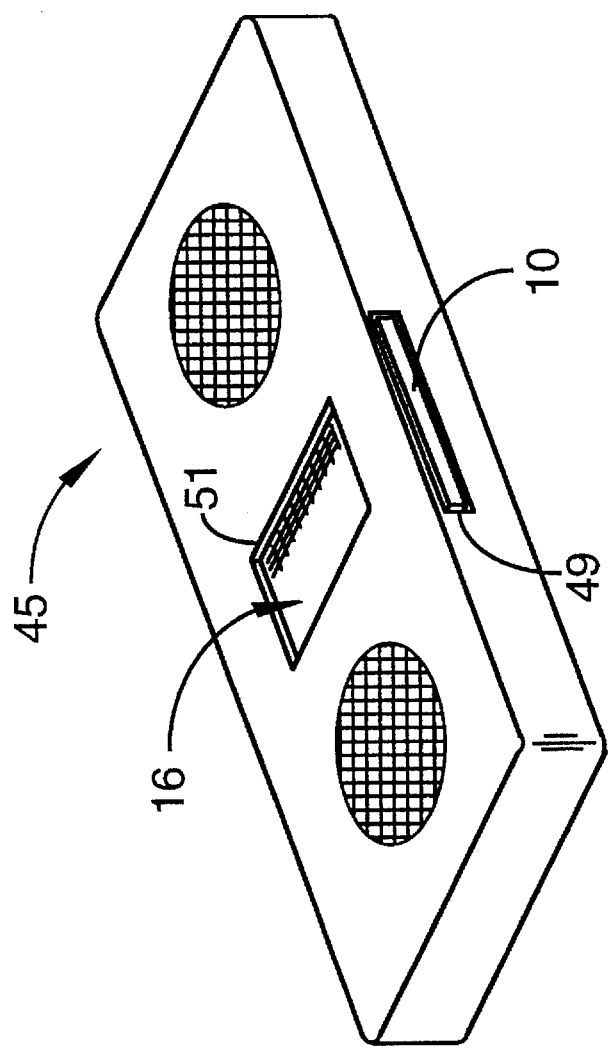
FIG. 11 is an isometric drawing of a µPDA docked in a dedicated cellular or cordless telephone according to an embodiment of the present invention.

Cellular Telephone Interface:

FIG. 11 is an isometric view of a μPDA docked in a dedicated cellular telephone 45 according to an embodiment of the present invention. Telephone 45 has a docking port 49 for a μPDA according to the invention. In this embodiment, port 49 is on one side of telephone 45, and there is a window 51 to provide access to I/O interface 16 of the μPDA after it is docked. With the μPDA docked, all of the software and memory of the μPDA is available to the telephone and a user may operate the phone by I/O interface 16.

In this aspect of the invention, unique control routines and display configurations are provided to enhance use of the cellular phone. For example, all of the user's collection of phone numbers, associated credit card numbers, access codes, etc. are readily available and may be quickly and conveniently accessed and used. In one aspect, a simple input displays alphabet letters to select, and once a letter is selected, a partial list of parties that might be called is displayed. One may scroll through the list by touch input or by use of the thumbwheel of the μPDA and select a highlighted entry. It is not required that the telephone numbers be displayed.

Once a party to be called is selected, the μPDA dials the call, including necessary credit card information stored in the memory of the μPDA for this purpose.

In a further embodiment, the calls are timed and timestamped and a comprehensive log, with areas for notes during and after, is recorded.

In another embodiment, conversations are digitally recorded and filed for processing later. A future embodiment may include a voice compression program at a host or within cellular phone 45. Compressed voice files, such as, for example, messages to be distributed in a voicemail system, may be downloaded into the μPDA or carried in a larger memory format inside the cellular telephone. The μPDA can then send the files via a host or dedicated modem attached at connector portion 20 to the optional expansion bus 40 (FIG. 6).

The cellular telephone may, in this particular embodiment, have a bus port for digital transmission. In this case, the compression algorithm along with voice system control routines are also established at the receiving end of the transmission to uncompress the signal and distribute individual messages.

In a further embodiment, voice messages may be sent in a wireless format from the cellular telephone in uncompressed digital synthesized form, distributing them automatically to dedicated receiving hosts, or semi-automatically by manually prompting individual voicemail sysems before each individual message. In a further aspect of wireless transmission, a microphone/voicenote μPDA as in FIG. 10 may send previously stored voicenotes after docking in a cellular telephone interface.

In Europe and Asia a phone system is in use known as CT2, operating on a digital standard and comprising local substations where a party with a compatible cellular phone may access the station simply by being within the active area of the substation. In one aspect of the present invention, a CT2 telephone is provided with a docking bay for a μPDA, and configured to work with the μPDA. In yet another aspect of the invention, in the CT2 telephone system, and applicable to other digital telephone systems, a compression utility as disclosed above is provided to digitally compress messages before transmission on the CT2 telephone system.

It is roughly estimated that a dedicated compression algorithm may compress ten minutes of voice message into one minute using the existing CT2 technology. This would save on telephone use charges significantly. In this aspect, there needs be a compatible decompression facility at the receiving station, preferably incorporated into a standard μPDA voicemail system for CT2 or other digital transmissions.

In a further embodiment, control routines are provided to enable the microphone/voicenote μPDA as illustrated in FIG. 10 to carry digital voicenotes, either compressed of uncompressed. When docked in a CT2-compatible μPDA cellular telephone, the μPDA in this embodiment can transmit the digital voicenotes in compressed form.

Figure 12:
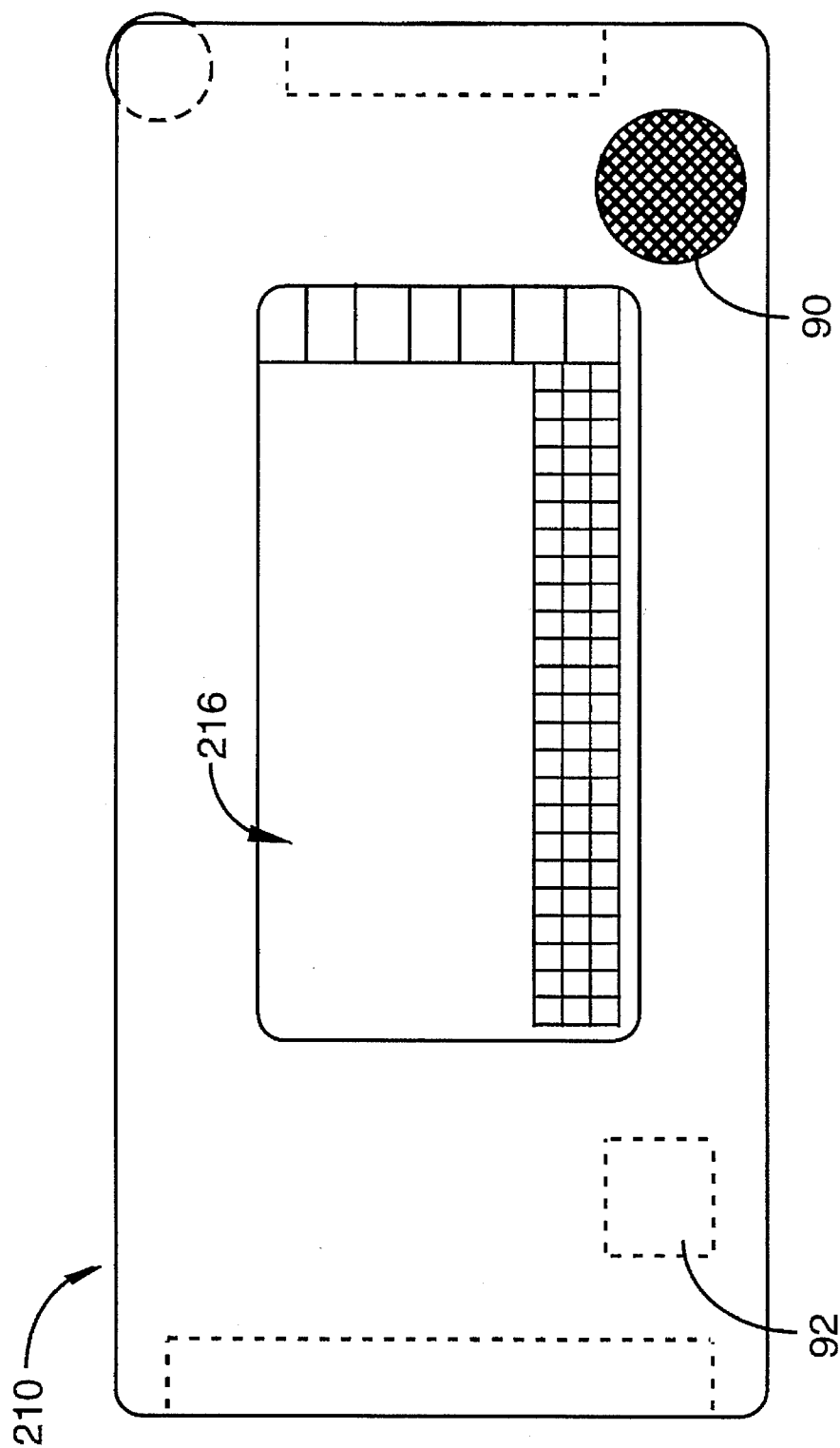
FIG. 12 is a plan view of a µPDA with a speaker and pager interface according to an embodiment of the present invention.

Speaker/Pager:

FIG. 12 is a plan view of a μPDA 210 with a microphone/ speaker area 90 and a pager interface 92 according to an embodiment of the present invention. This μPDA has the ability to act as a standard pager, picking up pager signals with installed pager interface 92 and alerting a user through microphone/speaker 90. Once the signals are received, μPDA 210 can be docked in a compatible cellular telephone as illustrated in FIG. 11 and the μPDA will automatically dial the caller's telephone number. All other aspects are as described in the docked mode in the cellular telephone.

In another embodiment, the speaker/pager μPDA can be prompted to generate DTMF tones. The DTMF tones are generated from a caller's telephone number.

The speaker/pager μPDA can store pager requests in its onboard memory. It can also display all pager requests including time and date stamps, identification of the caller, if known, and other related information, on I/O interface 216. In this particular embodiment, a user can receive a page, respond immediately in digital voicenotes on the μPDA via speaker/microphone 90, and then send the response from a dedicated μPDA-compatible cellular telephone or conventional telephone.

Figure 13:
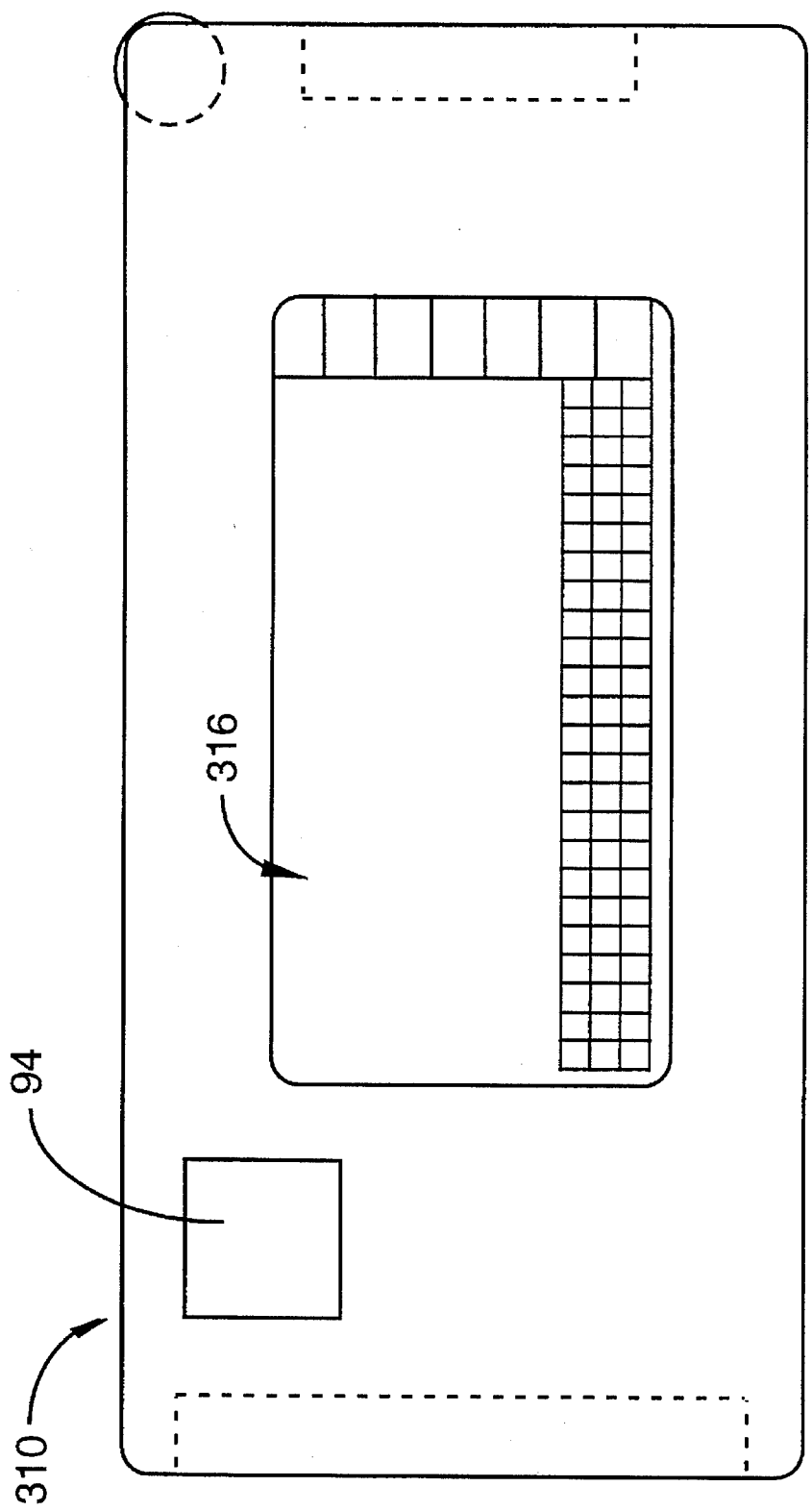
FIG. 13 is a plan view of a µPDA with an infrared communication interface according to an embodiment of the present invention.

Wireless Infrared Interface:

FIG. 13 is a plan view of a μPDA 310 with an IR interface 94 according to an embodiment of the present invention. In this embodiment the μPDA may communicate with an array of conventional appliances in the home or office for providing remote control. Unique signals for the appliances are programmed into the μPDA in a learning/receive mode, and filed with user password protection. Once a correct password in entered, an icon-based menu is displayed on I/O area 316 in a user-friendly format. A master routine first queries a user for which device to access. For example, in a residential application, icons are displayed for such things as overhead garage doors, security systems, automatic gates, VCRs, television, and stereos.

In another aspect of the invention, a receiving station such as a host computer or peripheral interface has IR capabilities to communicate data directly from a nearby μPDA with an infrared interface. In a further embodiment the μPDA may interface in a cellular network and act as a wireless modem.

PERIPHERALS

A μPDA may serve as the platform for various peripheral attachments via expansion port 20 (FIG. 1B and others). Upon attachment to a peripheral, a dedicated pin or pins within expansion port 20 signal microcontroller 11, and a peripheral boot-strap application is executed. Interfacing control routines, which may reside in the peripheral or in the memory of the μPDA, are then executed, and the μPDA I/O interface displays the related menu-driven options after the linking is complete.

Figure 14:
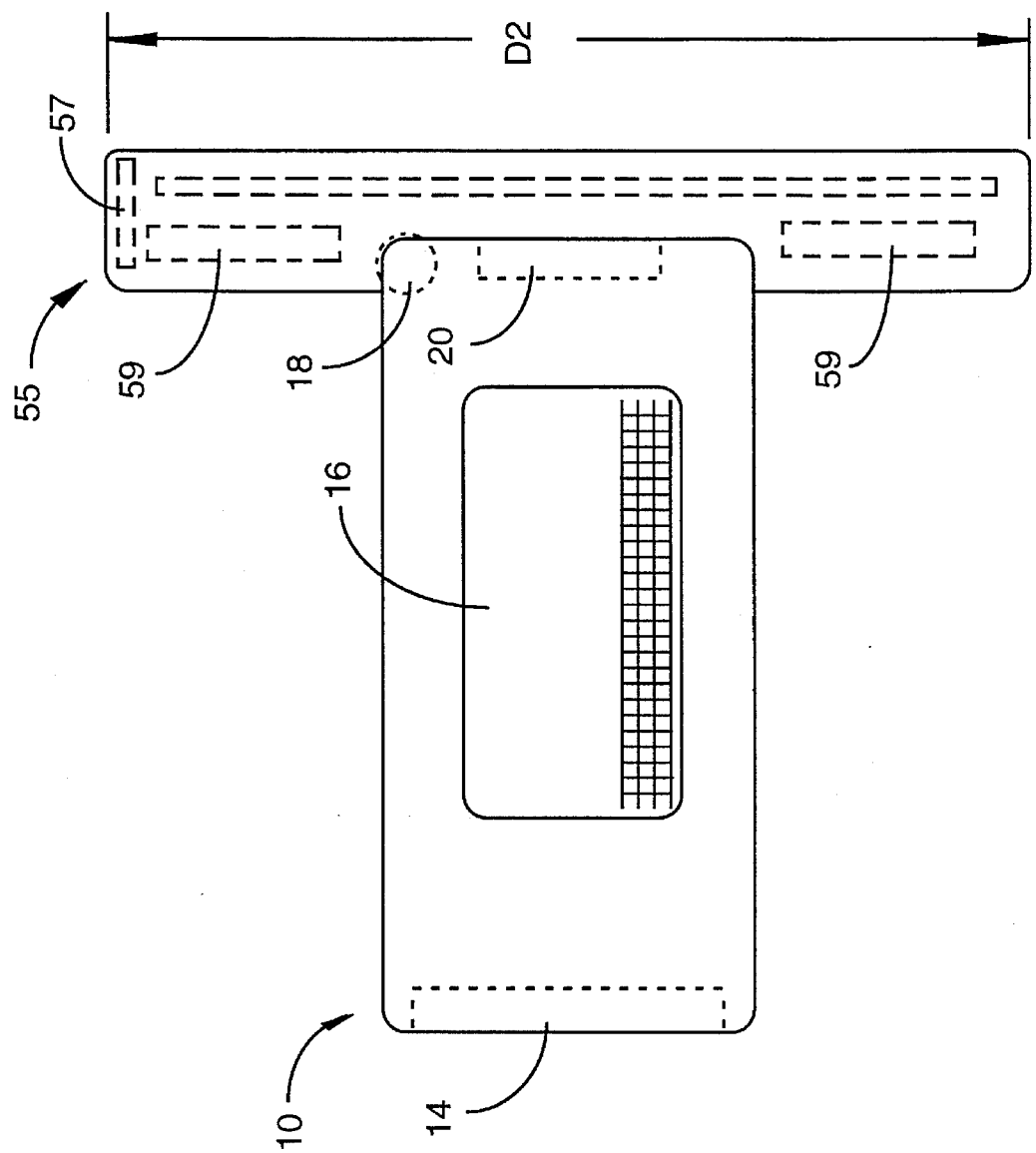
FIG. 14 is a plan view of a µPDA with a scanner attachment according to an embodiment of the present invention.

Scanner:

FIG. 14 is a plan view of a μPDA 10 with a scanner attachment 55 according to an embodiment of the present invention. The scanner attachment is assembled to the μPDA, making electrical connection via expansion port 20. In this embodiment the physical interface of the scanner is shaped to securely attach to the μPDA. Scanner attachment 55 has a roller wheel 57 or other translation sensor, which interfaces with wheel 18 of the μPDA, providing translation sensing in operation for the resulting hand-held scanner. In another aspect, scanner attachment 55 has a translation device which transmits the proper signal through expansion port 20. The scanner bar is on the underside, and one or more batteries 59 are provided within the scanner attachment to provide the extra power needed for light generation.

In the scanner aspect of the invention, scanner attachments 55 of different width D2 may be provided for different purposes. The bar may be no wider than the μPDA, or may be eight inches or more in width to scan the full width of U.S. letter size documents, or documents on international A4 paper. Unique control routines display operating information on the μPDA's I/O area 16 for scanning, providing a user interface for setup of various options, such as the width of the scanner bar, and providing identification for files created in the μPDA memory as a result of scan passes. Scanned data stored in the μPDA memory may be quickly transferred to the host via host interface 14 when the μPDA is docked. Unique routines may be provided to automate the process, so the user does not have to search for files and initiate all of the transfer processes.

Figure 15:
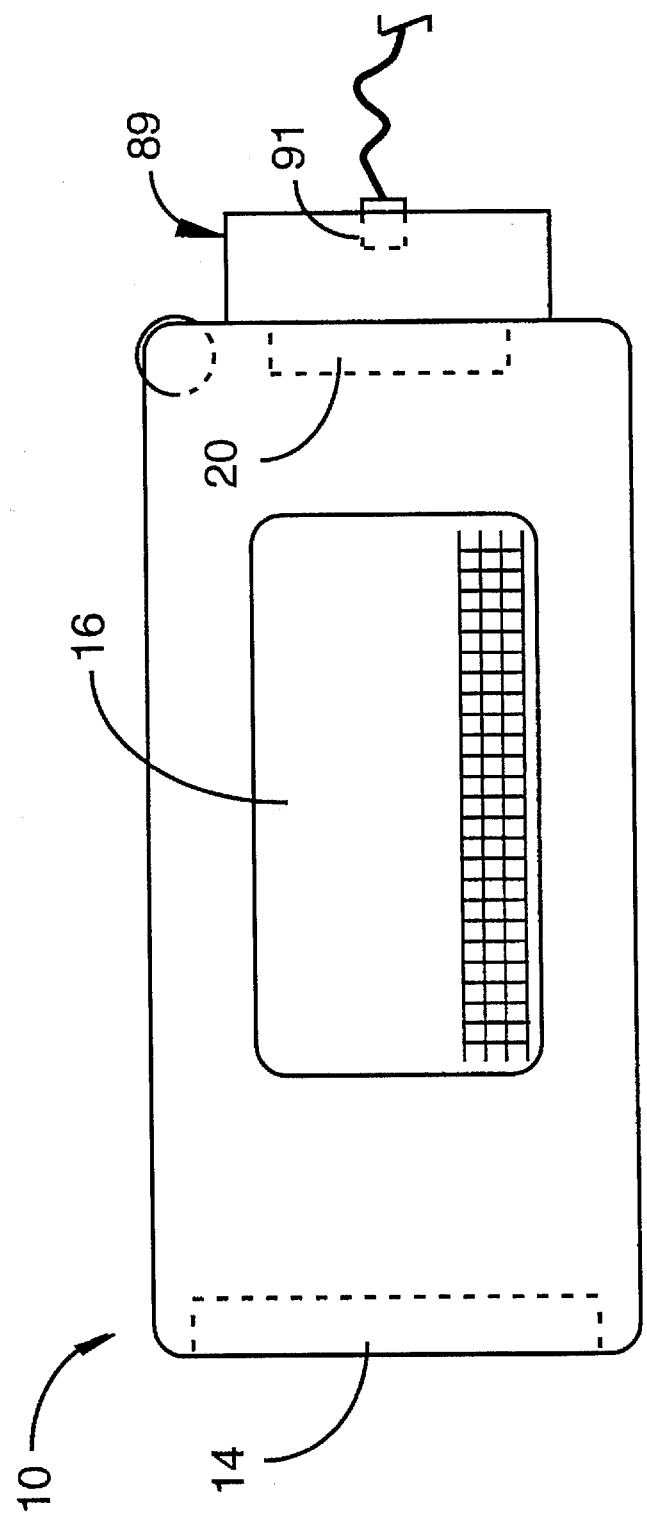
FIG. 15 is a plan view of a µPDA with a fax-modem attached according to an embodiment of the present invention.

Facsimile Option:

FIG. 15 is a plan view of a μPDA with a fax-modem module 89 attached according to an embodiment of the present invention. A fax and telecommunication capability is provided via conventional telephone lines to the μPDA by fax-modem 89 interfacing to expansion bus interface 20. The fax-modem has internal circuitry for translating from the bus states of the expansion bus to the fax protocol, and a phone plug interface 91. In another aspect, the μPDA can be docked in a host and be used in combination with fax-modem 89 to provide faxing and file transfers of both host and μPDA data files. In this case, the fax-modem routines are displayed on the host monitor.

Figure 16:
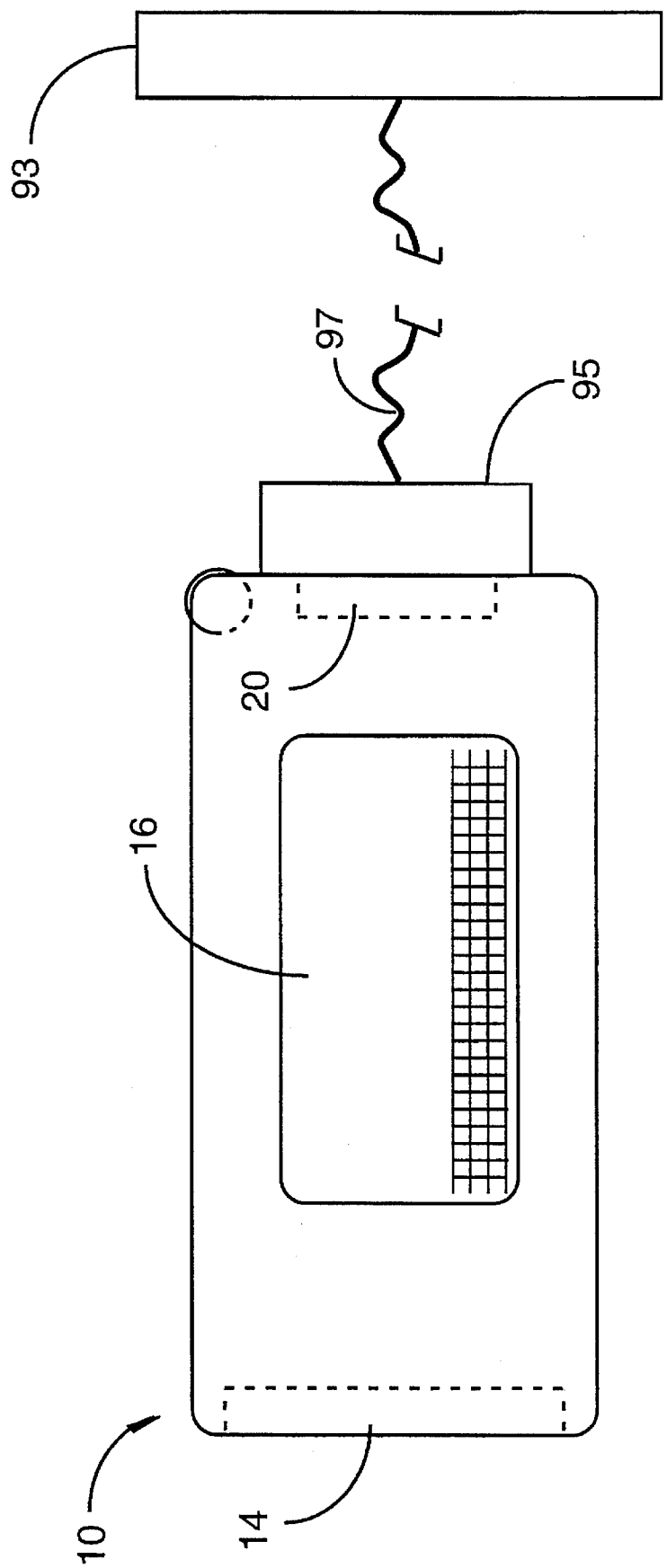
FIG. 16 is a plan view of a µPDA with a printer adapter interface according to an embodiment of the present invention.

Printer:

FIG. 16 is a plan view of a μPDA with a Centronics adapter interface according to an embodiment of the present invention. A printer connector 93 engages expansion interface 20 by a connector 95 through a cable 97. Translation capability resides in circuitry in connector 93, which is configured physically as a Centronics connector to engage a standard port on a printer.

Figure 17:
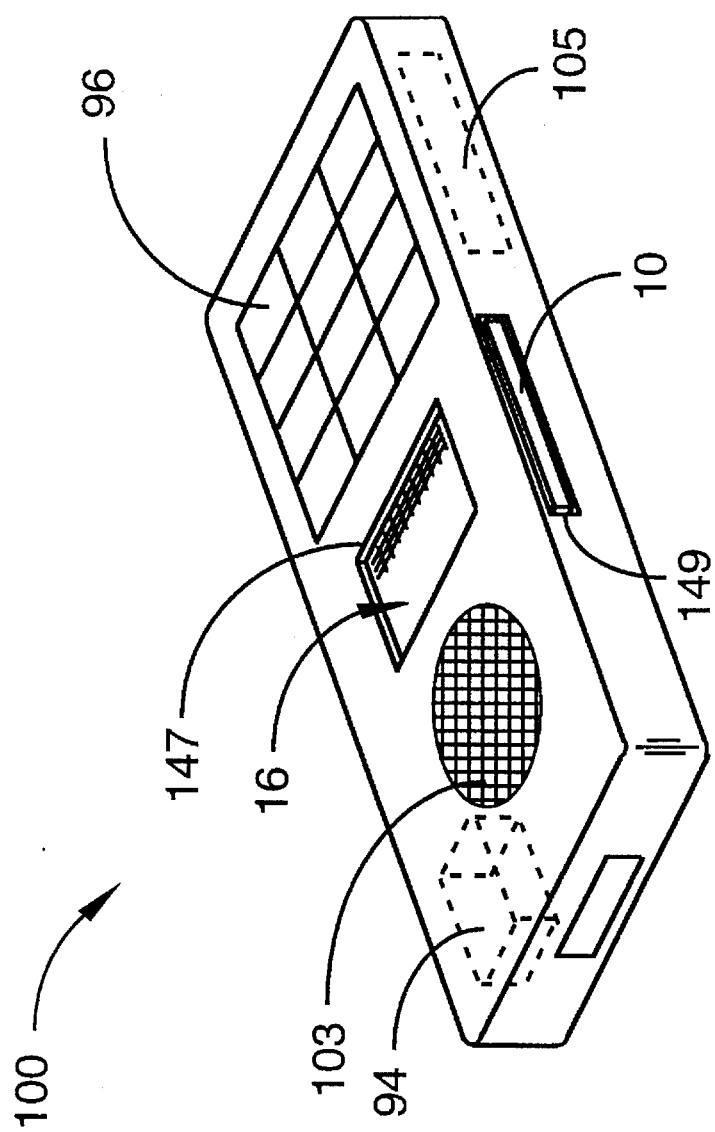
FIG. 17 is an isometric drawing of a µPDA docked in a barcode reader providing a data acquisition peripheral according to an embodiment of the present invention.

Barcode Reader and Data Acquisition Peripheral:

FIG. 17 is an isometric view of a μPDA 10 docked in a barcode reader and acquisition peripheral 100 according to an embodiment of the present invention. μPDA 10 is docked in docking bay 149. I/O interface 16 displays information through opening 147 according to specialized data acquisition applications. In this particular embodiment peripheral 100 has an IR interface 94, a microphone 103, a scanner port 101 (not shown), battery pack 105, and a numeric keypad pad 96 implemented as a touch-sensitive array.

Application routines enable the data acquisition peripheral to operate as, for example, a mobile inventory management device. The user may scan barcode labels with scanner 101 and enter information, such as counts, on keypad 96 or by voice input via microphone 103. Since applications of peripheral 100 are very specialized, only a limited voice recognition system is needed. The voice recognition system may prompt other command routines within the master applications as well.

As inventories are collected, the database may be displayed and also manipulated directly via I/O area 16 in open bay 147, or information may be downloaded at a prompt to a nearby host via IR interface 94.

Alternatively to frequent data transmission, data may be stored or an auxiliary option memory location in peripheral 100.

In another aspect, the data acquisition peripheral may be interfaced to the analog output of a monitoring device, such as a strip chart recorder, and may digitize and store the incoming analog signals.

Figure 18:
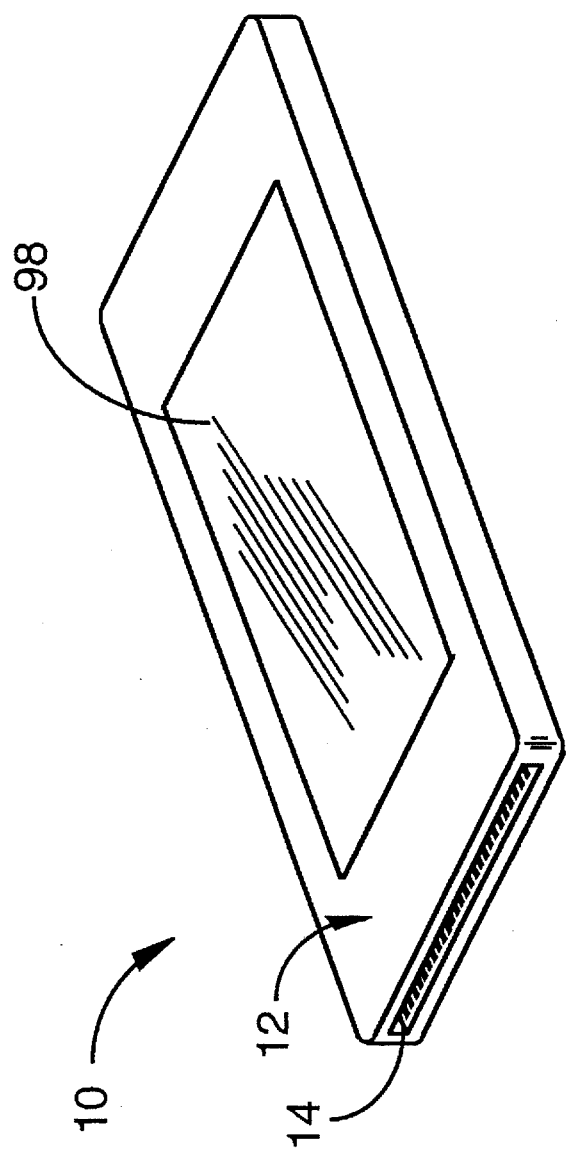
FIG. 18 is an isometric view of a µPDA with a solar charger according to an embodiment of the present invention.

Solar Charger:

FIG. 18 is an isometric view of the side of a μPDA 10 opposite the I/O interface with a solar charger panel 98 according to an embodiment of the present invention. Panel 98 is positioned so that when μPDA 10 is in strong light, such as sunlight, the solar charger absorbs the solar energy and converts it to electricity to recharger battery 15 inside the μPDA. Solar charger 98 may be permanently wired to the circuitry of the μPDA or attached by other means and connected to a dedicated electrical port or the expansion port. The solar charger is placed so that the μPDA can be fully docked in a docking port with the panel in place. In another aspect, a detachable solar charger may be unplugged before docking the μPDA, and the detachable charger may then be of a larger surface area.

Figure 19:
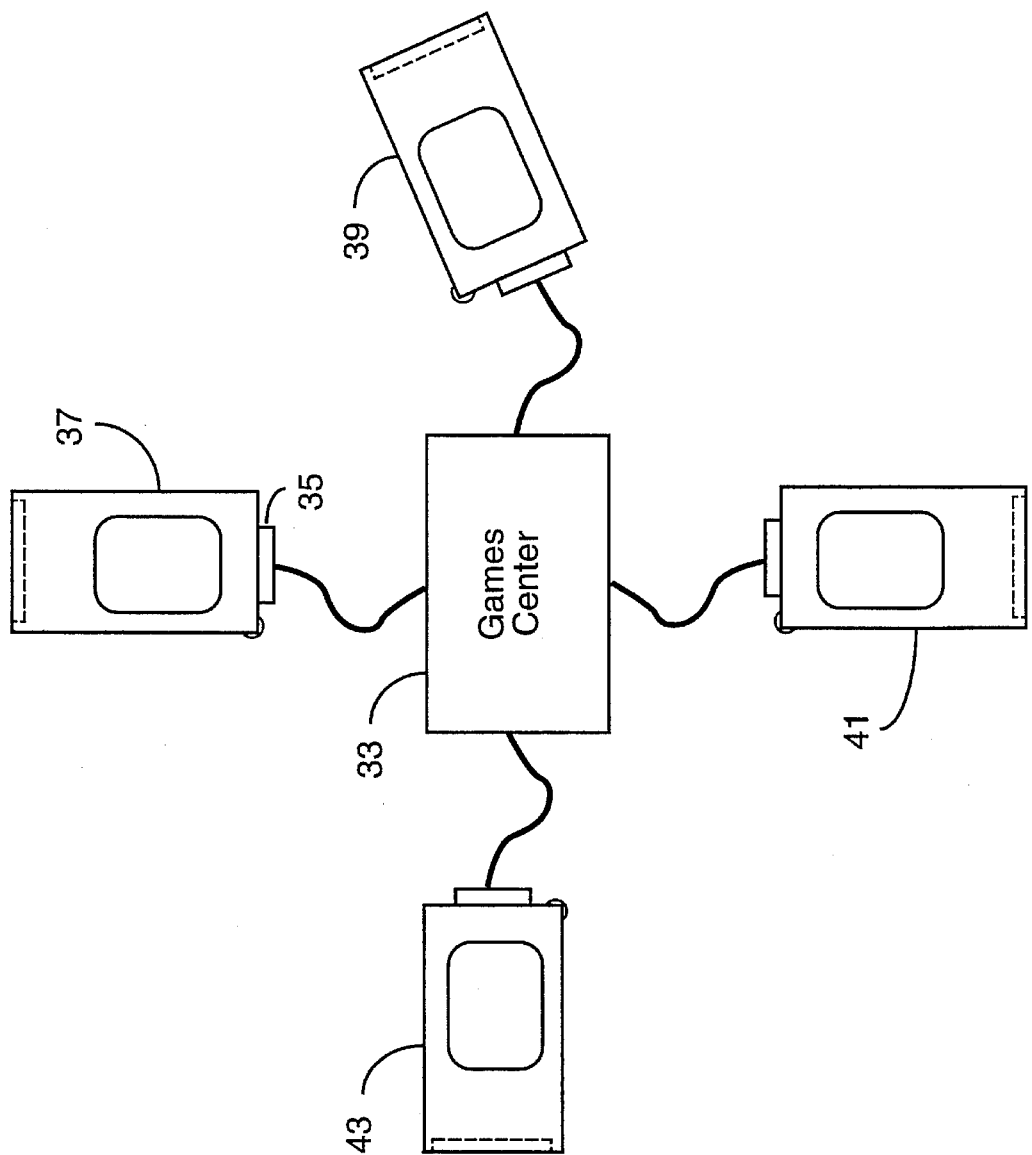
FIG. 19 is a plan view of four µPDAs interfaced to a dedicated network console providing inter-PDA communication according to an embodiment of the present invention.

Games/Conference Center:

FIG. 19 is a largely diagrammatic representation of a Games Center unit 33 according to an aspect of the invention for connecting several μPDA units (37, 39, 41, and 43) together to allow competitive and interactive games by more than one μPDA user. Games Center unit 33 is controlled by an 80486 CPU in this particular embodiment. μPDAs may be connected to the central unit by cable connection via the expansion bus or the host interface of each μPDA, through a connector such as connector 35. The drawing shows four connectors, but there could be as few as two, and any convenient number greater than two.

As a further aspect of the present invention, the gaming center may serve as a conference center where a number of μPDAs may exchange information. In this way, for example through custom routines stored and executable in central unit 33, a manager may update a number of salespeoples' μPDAs, including but not limited to merchandise databases, spreadsheets, price sheets, work assignments, customer profiles, address books, telephone books, travel itineraries, and other related business information while in conference.

Figure 20:
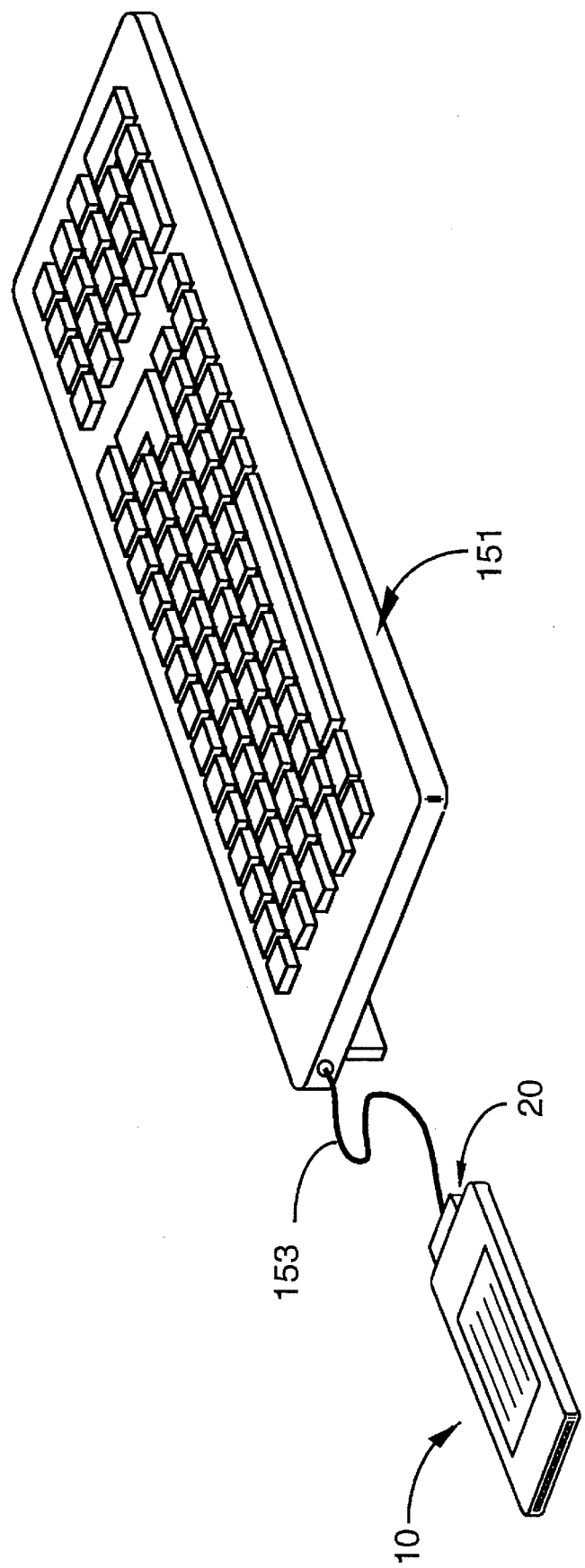
FIG. 20 is an isometric view of a µPDA according to the invention connected by the expansion port to a standard-sized keyboard.

Standard Keyboard:

FIG. 20 is an isometric view of a keyboard 151 connected by a cord and connector 153 to a μPDA 10 via the expansion port 20. In this example, the keyboard is a mechanical keyboard having a full-size standard key array and an on-board controller and interface for communicating with the μPDA. In other embodiments the keyboard may take many other forms, including a two-layer, flexible, roll-up keyboard as taught in U.S. Pat. No. 5,220,521.

In addition to keyboards, other input devices, such as writing tablets and the like may also be interfaced to a μPDA via expansion port 20.

There are numerous additional ways to combine different embodiments of the μPDA for useful functions. For example, an IR-equipped μPDA attached to scanner 55 may transfer large graphic files in near real time to a host computer. If the files were of text, the host may further process the files automatically through an optical character recognition (OCR) application and send the greatly reduced ASCI files back to the μPDA. As discussed above, the μPDA family of devices establishes a protocol of software security and distribution as well as having the ability to be bus mastered by a host computer system for numerous applications.

Reconfigurable Keyboard:

In the section above entitled "Standard Keyboard", various optional keyboards are discussed without disclosure of considerable detail. A full-sized keyboard that may be geometrically reconfigured to assume different form factors for transport and storage is disclosed below.

FIG. 21 is a plan view of a keyboard 1011 according to the present invention comprising two parts 1013 and 1015. Part 1013 and part 1015 are separable along a parting line 1017 which follows a broken-line path between keys on the face of the keyboard. The two parts plug together by means of connectors as described below.

FIG. 22 is a plan view of the keyboard of FIG. 21 with parts 1013 and 1015 disconnected and moved apart to illustrate the parts separately. In FIG. 21 in this embodiment length dimension D6 is about 45 cm, and width dimension D5 is about 15 cm., which is a form factor of about 3:1. Dimension D3 of each of parts 1013 and 1015 is about one-half of D6, or 22.5 cm. These dimensions may vary, but generally the form factor D6/D5 is from 2.5 to 3.5.

Figure 23:
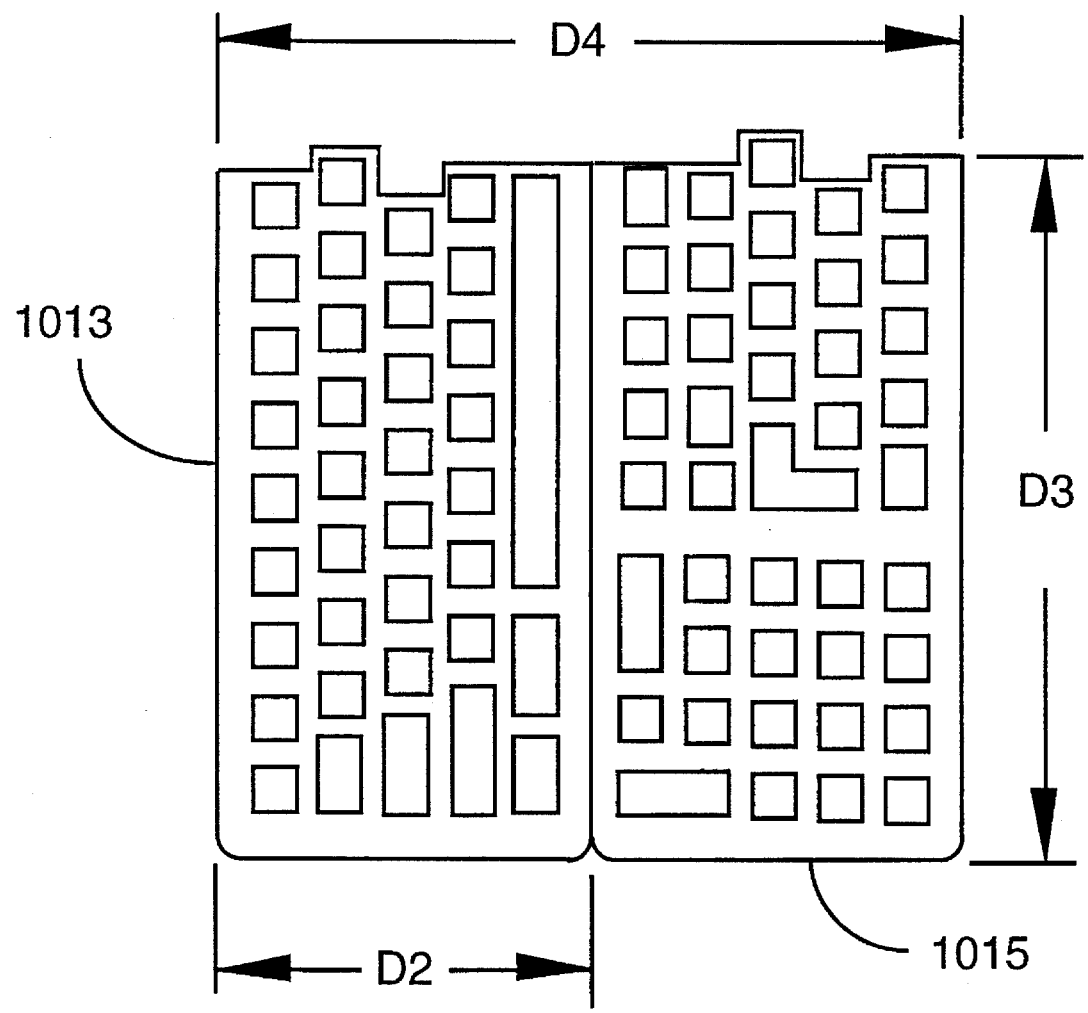
FIG. 23 is a plan view of the keyboard of FIG. 21 and FIG. 22 shown rotated and rejoined for storage with a smaller form factor.

FIG. 23 shows parts 1013 and 1015 rotated by 90 degrees in opposite directions and placed side-by-side, forming a unit with a new form factor. The dimensions in this arrangement are D3 about 22.5 cm. and D4 about twice D5, or 30 cm. The form factor in this arrangement is about 30/22.5= 1.33, as compared to a form factor of about 3.0 for the assembled keyboard as in FIG. 21.

The form factor of the rearranged parts as in FIG. 23 is more compatible with the form factor of a portable computer than is the form factor of the plugged-together keyboard as shown in FIG. 21.

Figure 24:
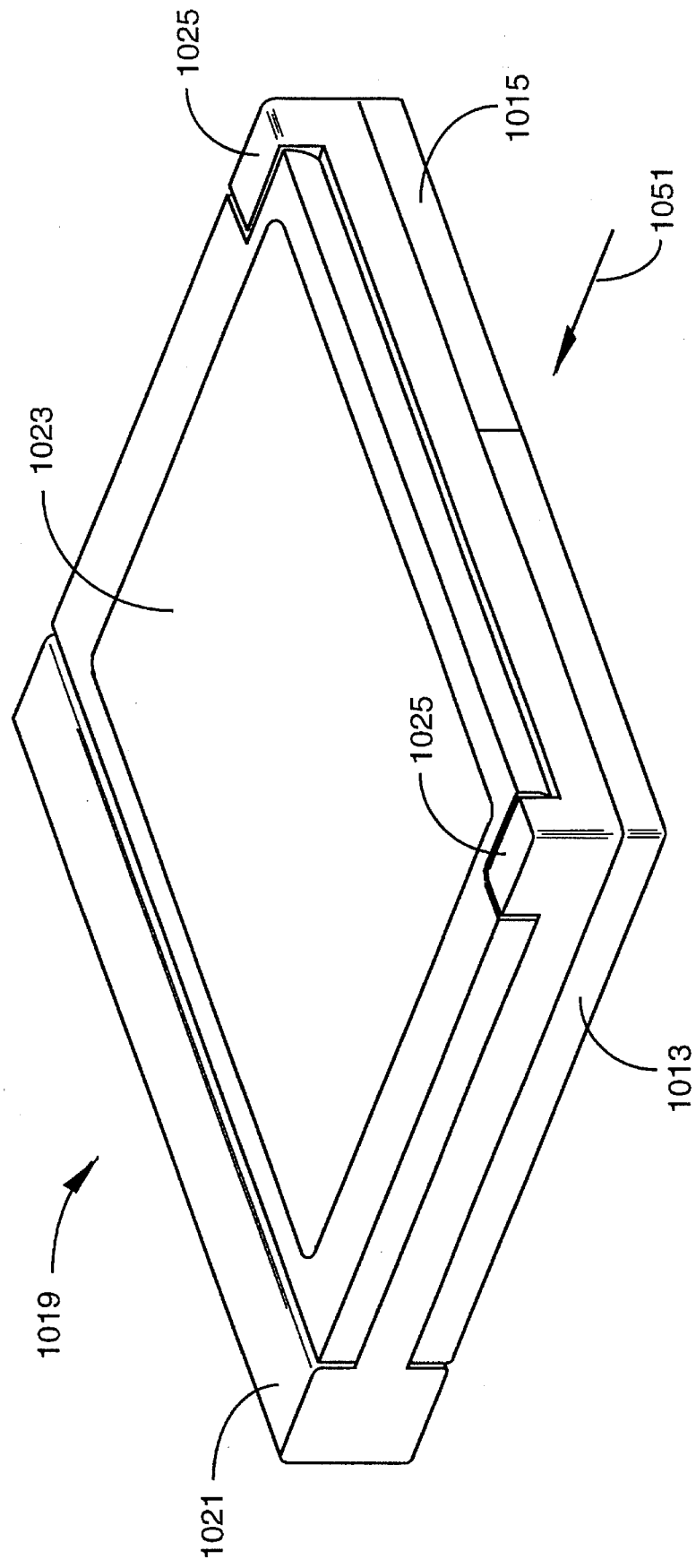
FIG. 24 is an isometric view of a notebook computer according to the present invention.

FIG. 24 is an isometric view of a portable computer 1019 according to an embodiment of the present invention comprising two-part keyboard 1011 of FIG. 21. Keyboard parts 1013 and 1015, placed together as shown in FIG. 23, are fastened to a case 1021. A display 1023 is fastened to case 1021 by hinges 1025. In the configuration shown in FIG. 24, with the display folded against the case, and the keyboard parts separated and stored under the case as shown in the Figure, the unit forms a compact package for transport and storage.

Figure 25:
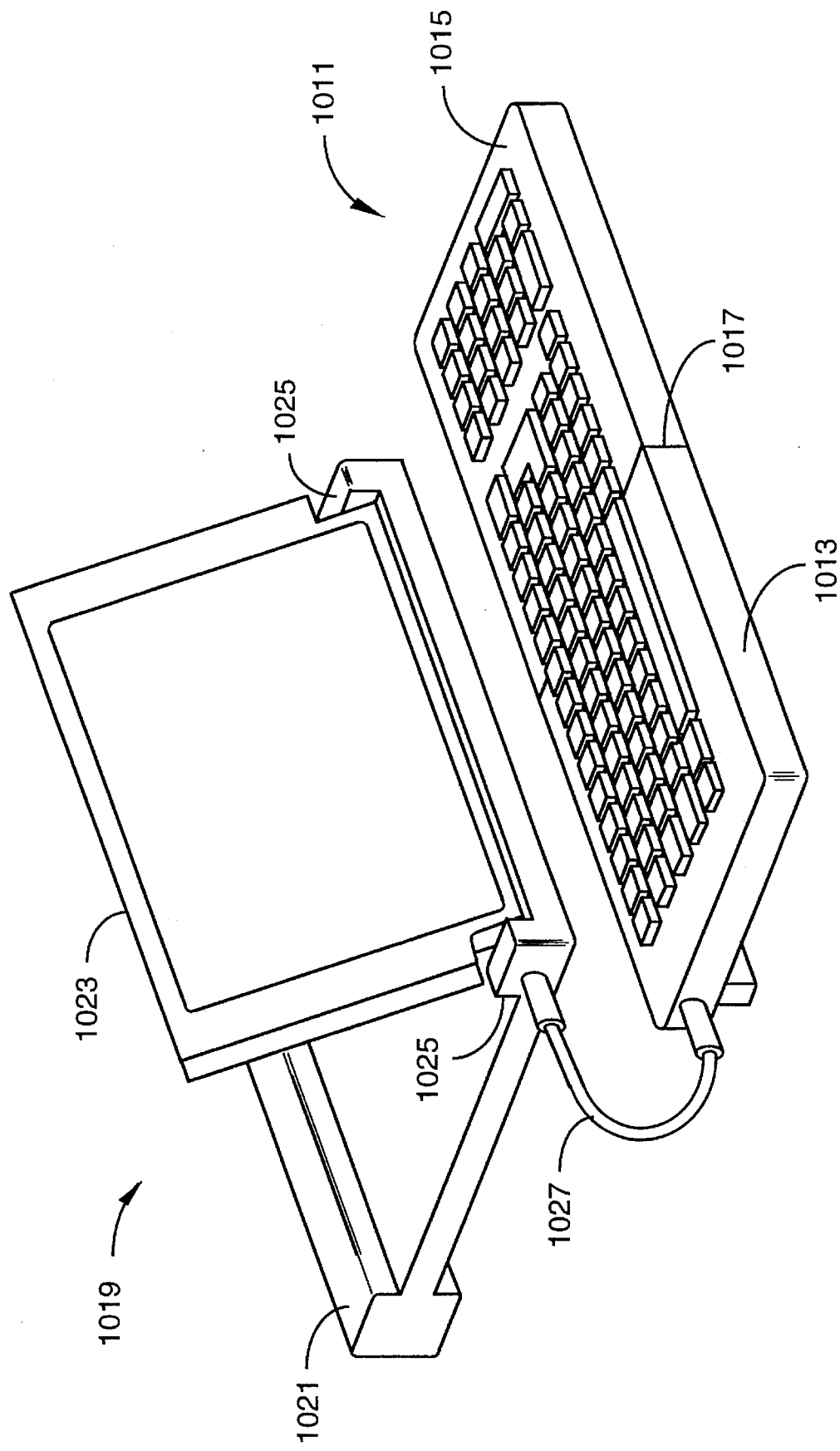
FIG. 25 is an isometric view of the notebook computer of FIG. 4 showing the separable keyboard and display deployed for use.

FIG. 25 shows portable computer 1019 of FIG. 24 with keyboard 1011 separated from case 1021 and assembled for operation, and display 1023 rotated into position for use, Keyboard 1011 is connected to the computer in this embodiment by a conventional cable 1027, although the invention is not limited by the method of connection of the keyboard.

For example, the keyboard could be battery powered and configured to communicate by an optical or other electromagnetic means not requiring a cable. The invention is similarly not limited by the manner in which the display is associated with the computer case. The display could just as well pivot at the "back" of the case rather than at the "front", as shown, which would be similar to more conventional designs. Moreover, the display might be removable and connectable by a cable or other communication means in a manner similar to a "cordless" keyboard. This would afford even more flexibility to the user in placement of components for use.

The provision of a keyboard in two or more parts according to the invention allows for a larger keyboard than would be the case with a built-in keyboard or a one piece separable keyboard, and therefore enhanced usability. The increase in size is primarily due to the difference in form factor between a conventional keyboard and a portable computer display case.

As an example of the limitations imposed by difference in form factor, consider the case described above for a notebook computer having a form factor of 1.33:1, with an integral keyboard having a form factor of 3:1. In this example length is the longer dimension and width the shorter, so the length of a notebook computer case is the dimension from left to right facing the computer and the width is from front to back.

Assuming the notebook computer to have dimensions of length 30.5 cm. (12 inches), and width about 23 cm. (9 inches), the length of the keyboard is restricted to 30.5 cm., and the form factor of 3:1 for the dictates a width for the keyboard of about 10 cm. (4 inches).

A two part keyboard according to the present invention for the case described immediately above can have a length equal to twice the width of the case, or about 46 cm. (18 inches), and a width equal to one-half the length, or about 15.3 cm (6 inches). The keyboard according to the invention, removed from the case assembled for use, is 18 inches by 6 inches, as opposed to 12 inches by 4 inches for the conventional dedicated keyboard, and affords an increase in surface area of 225%.

FIG. 22 shows a two-part keyboard according to the present invention separated along a parting line, and FIG. 23 shows the two parts rotated to form a form factor storable in the form factor of the notebook computer. There are a number of ways the separation may be made and communication between the parts may be accomplished.

FIGS. 26A and 26B show an embodiment of a two-part keyboard 1029 wherein the parts 1031 and 1033 are completely separable. There are a number of connection schemes possible for keyboards to provide signals from the keys and to communicate the keystrokes and combinations to a host. The most common is a "row and column" scheme wherein the signals are multiplexed. A connector between the two sections of a completely separable two-part keyboard in this case may need as many as thirty pins. The point is, the number of pins to accomplish communication is not severely limiting, in any case.

In the embodiment shown in FIGS. 26A, and, a male "edge" connector 1035 is utilized in part 1033 with sufficient "pins" to provide communication, and the edge connector engages a female mating connector 1037 in part 1031 in assembly. In this embodiment there are two "snap-in" connectors 1039 and 1041 in part 1033 that engage two female counterparts 1043 and 1045 in part 1031.

FIG. 26B is an elevation view of the interface between parts 1031 and 1033 in the direction of arrow 4107 in FIG.

26A, and shows the relative placement of the edge connectors and the snap-in connectors. The snap-in connector has a "lip" that engages a shoulder in the matching socket, and a release button 1049 is configured to deflect connectors 1039 and 1041 to release the parts to be separated. Button 1049 is recessed to avoid interference with placement of the parts during storage.

Figure 27:
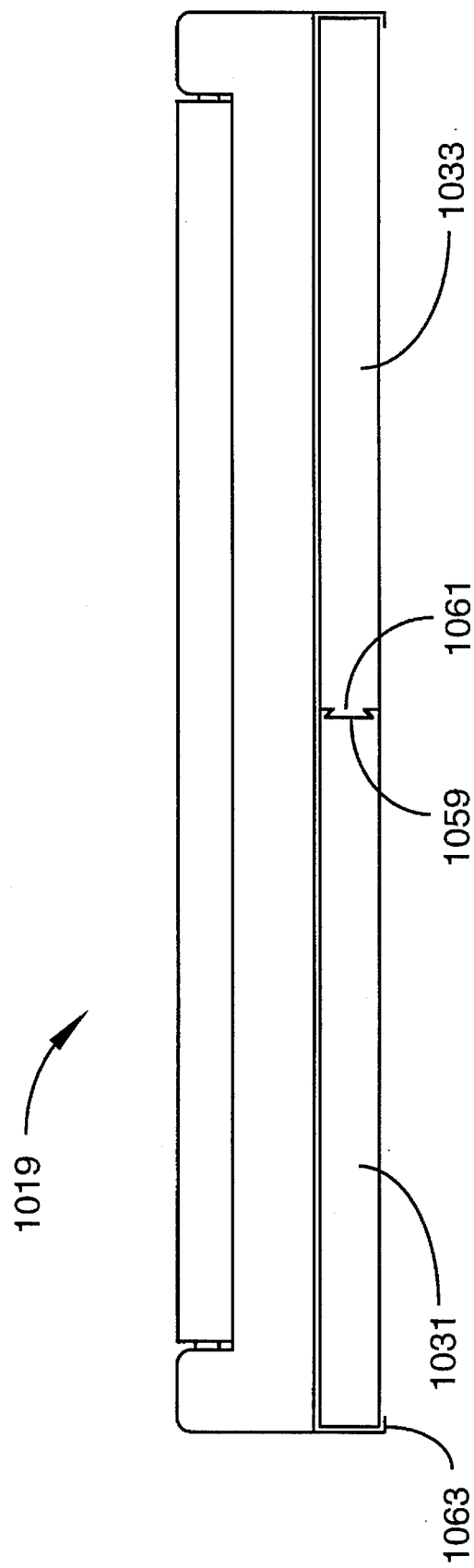
FIG. 27 is an elevation view of the keyboard of FIG. 6A, in the direction of arrow 1051 of FIG. 24.

FIG. 27 is a view of the two-part separable keyboard embodiment of the present invention shown in FIG. 26A, with the parts rotated 90 degrees and placed back together for storage beneath the case of a notebook computer 1053. This view is in the direction of arrow 1051 in FIG. 24. FIG. 24 is not meant to show the detail of the embodiment of FIGS. 26A and 6B. FIG. 7, however, shows additional detail. The re-arrangement places the two parts of the keyboard in the general relationship shown in plan view by FIG. 23.

The edges along which parts 1031 and 1033 are joined to store under notebook 1019 are edges 1055 and 1057 (FIG. 26A), although the parallel edges opposite edges 1055 and 1057 might be used in another embodiment. Edge 1055 is provided with an undercut groove 1059, and edge 1057 has at least one protruding wedge-shaped rail, of which rail 1061 is exemplary. The rail or rails are inserted into the groove to assemble the two disconnected parts together in the smaller form factor ratio for storage.

When the storable unit is placed under the notebook computer, it is supported on the outside edges by shelf rails of which rail 1063 is exemplary. There are also spring-loaded detents (not shown) for holding the stored keyboard in place under the computer case.

It will be apparent to one with skill in the art that there are alternative details for connectors, joining, and storing the two halves of the keyboard, which may be considered equivalent to the embodiment described, rather than outside the scope of the present invention.

Figure 28:
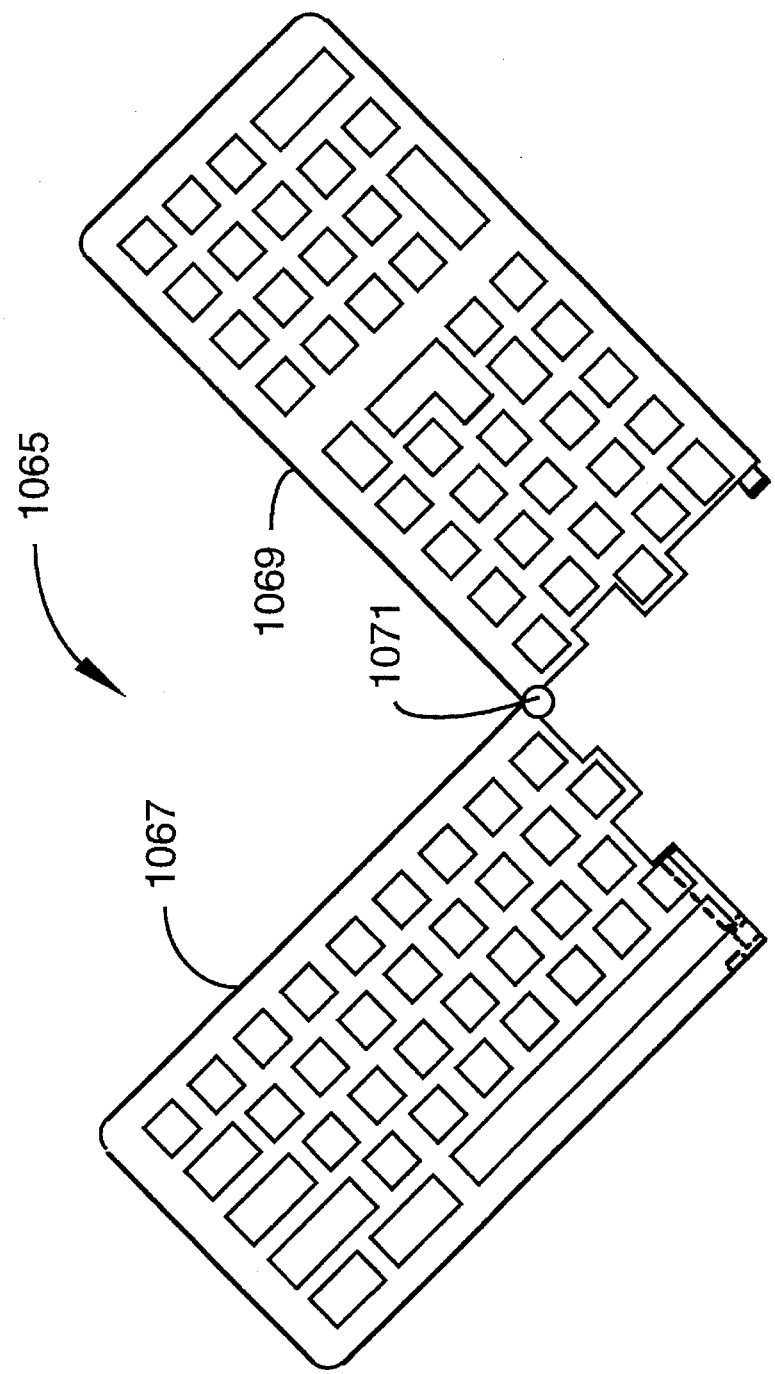
FIG. 28 is a plan view of a two-part keyboard according to the invention comprising a hinge at one end of the interface.

FIG. 28 illustrates another alternative embodiment of a keyboard 1065 wherein the two parts 1067 and 1069 are hinged together at one end of the joining interface at a hinge 1071, and connection through the hinge is by a cable or other multi-conductor (not shown) with enough traces to provide communication between the halves of the keyboard. In this embodiment, the edge connector is no longer needed, but a snap-in connector at the end of the interface opposite the hinge is still useful to hold the keyboard in place in the unfolded condition for use. The rail and groove elements along meeting edges in the storable orientation are also no longer needed. The hinged keyboard may be stored in much the same manner as the plug-together embodiment described above.

Inductive Keyboard Coupling:

Apparatus and method for inductively coupling keystroke codes between a full-sized keyboard and a µPDA are disclosed below, providing a unique system wherein a full-sized keyboard may be used with a µPDA without the encumbrance of a cable connection.

Figure 29:
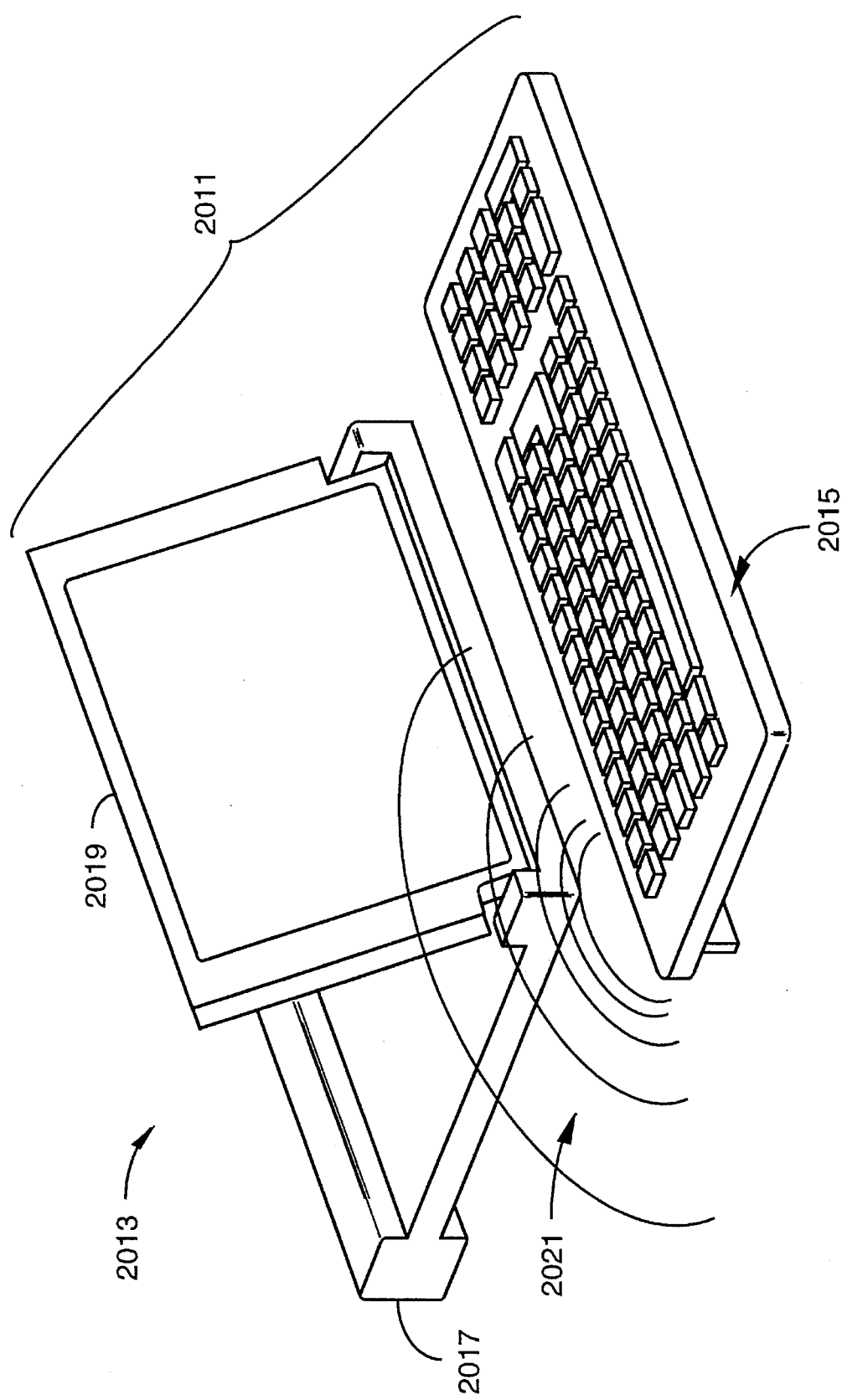
FIG. 29 is a perspective view of a computer with a keyboard according to the present invention.

FIG. 29 is an isometric view of a general-purpose portable computer with a keyboard coupled by induction apparatus according to the present invention. The computer system of FIG. 29 comprises a principle unit 2013 including a housing 2017 and a tilt-up display 2019. The display may one of several types of available flat-panel displays. Housing 2017 contains the principal electronic operating elements, such as a CPU microprocessor, an I/O bus, and system Ram memory. There are connectors (not shown) for connecting to serial devices and the like, which is typical for portable computers.

A separate keyboard unit 2015 provides alphanumeric and other keystroke input without benefit of a cable connection, by means of encoded information transmitted on a magnetic field represented by magnetic lines of force 2021.

Figure 30:
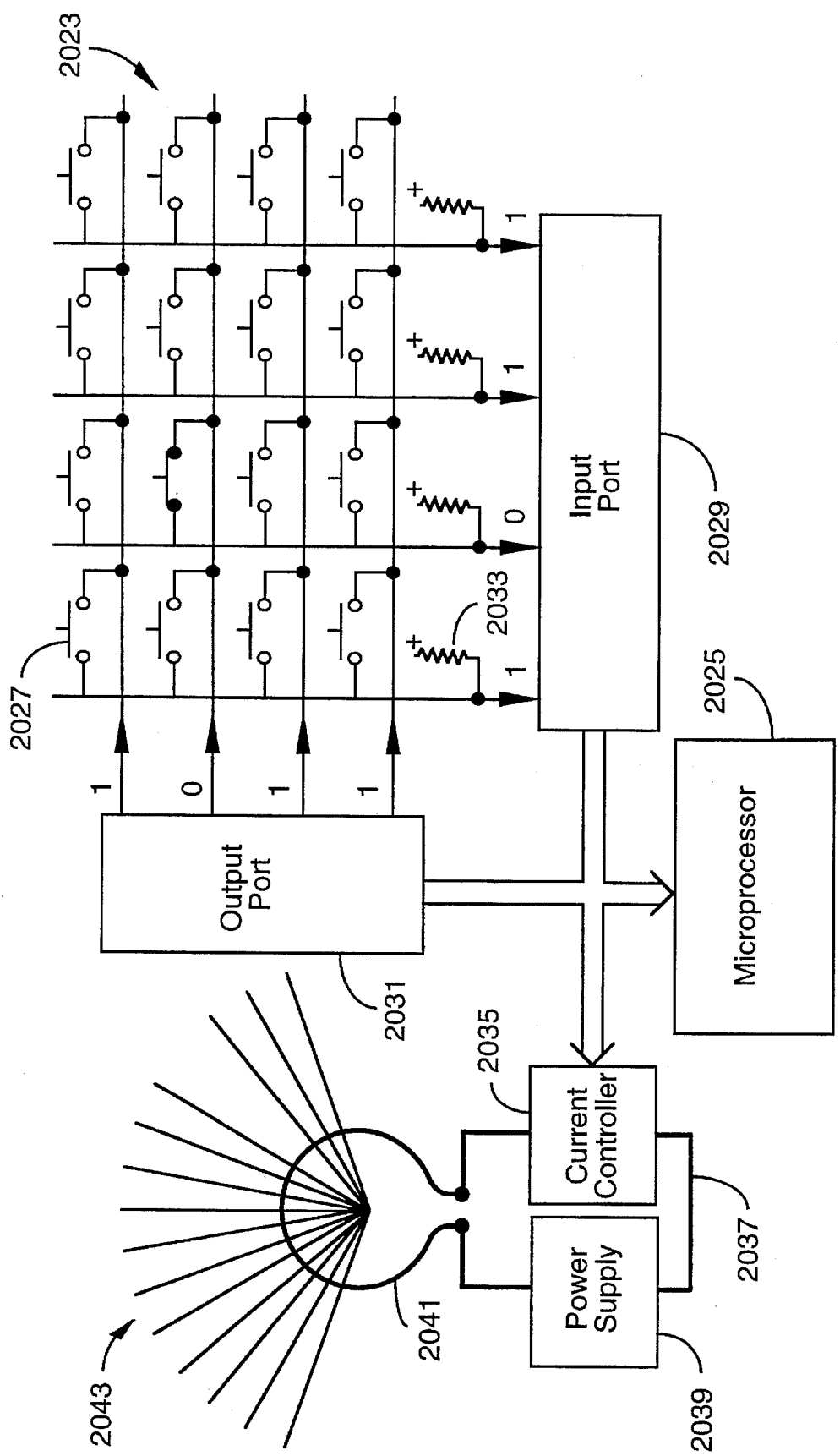
FIG. 30 illustrates a key switch matrix interfaced to a microprocessor and a magnetic transmitter according to the present invention.

FIG. 30 is a schematic illustrating some of the internal elements of keyboard 2015. In this particular embodiment the key switches (hereinafter the keys) are connected in a matrix 2023 and scanned by a microprocessor 2025 contained within the framework of the keyboard. The scanned matrix arrangement greatly reduces the number of I/O port bits needed for large numbers of keys. This scanned matrix arrangement is but one of a number of convention means by which the key operations may be recognized by an on-board microprocessor, and is used here as an example. The invention may actually be combined with virtually any means known in the art for recognizing and coding the keystrokes. Further, there are a number of other conventional features about keyboards that are not covered here because they have little bearing on the invention. For example, keyboards typically have a small number of indicative LED's for indicating Num Lock, Caps Lock, Scroll Lock, etc., and these features are not described herein.

The scanned matrix of FIG. 30 shows 16 keys interfaced to microprocessor 2025 through a four-bit input port 2029 and a four-bit output port 2031. Pull up resistors (resistor 2033 is an example), connected to an on-board, battery-driven power supply (the connections are not shown in FIG. 30), provide a high level at the input port when no keys a pressed in a column.

In scanning, the matrix is read one row at a time. One of the output port bits is set to 0 while all the others are set to 1. In FIG. 30 the second row down is being read. The keys in rows with the output bit set to 1 are effectively disabled, as pressing a key would only connect a high-level output port bit to an input port bit that is already pulled high by the pull-up resistor. The keys in the row driven by the 0 set bit are active. Pressing any key in the active row pulls the input port bit in the corresponding column low. Each row is read in turn, and the sequence is repeated indefinitely.

The matrix must be fully scanned at a rate to insure if a user quickly presses and releases a key, the contact will not be missed by the microprocessor. In fact, not only the making of a contact is recorded, but breaking as well, which allows for key combinations to be recorded. It will be apparent to those with skill in the art that with the schematic shown, key combinations may result in "ghost" key readings, but this potential problem is handled by placing a diode (not shown) in series with each key.

The 16 key matrix is provided as an example, and is extensible in a number of ways to more keys. For example, input and output ports with more bits may be used. One 16 bit input and one 16-bit output port will support a matrix of 256 keys. Alternatively more ports with four or eight bits may be used. Typically a complete keyboard scan is made once every few milliseconds.

In a conventional keyboard and in the present embodiment of the invention the on-board microprocessor converts the information derived from scanning to hexidecimal scan codes. Typical scan codes are shown in the Winn Rosch Hardware Bible referenced above, on pages 250 through 253, although other scan codes are usable, and new scan codes may be arbitrarily contrived.

In a conventional system, the microprocessor sends the scan codes serially over a four-wire cable, with one wire carrying all of the data. The main portion of the computer in the conventional case receives these scan codes at a special I/O port, where a keyboard controller chip issues an interrupt to the CPU that a scan code is available to be read. The CPU then reads the scan code and interprets the key stroke information as input. The program for doing so is typically a part of the system BIOS.

In the system of the present invention there is no cable to transmit scan codes to the computer. In the embodiment shown by FIG. 30, microprocessor 2025 operates a current controller 2035 controlling current in a circuit 2037 from a power supply 22039. The controlled current passes through a one-turn generator loop 2041, creating a magnetic field represented by exemplary field lines 2043. In FIG. 30 generating loop 2041 is shown in plan view, so magnetic field lines 2043, which are generated orthogonal to the plane of the loop and conventionally circular in nature, are shown as lines.

Figure 31:
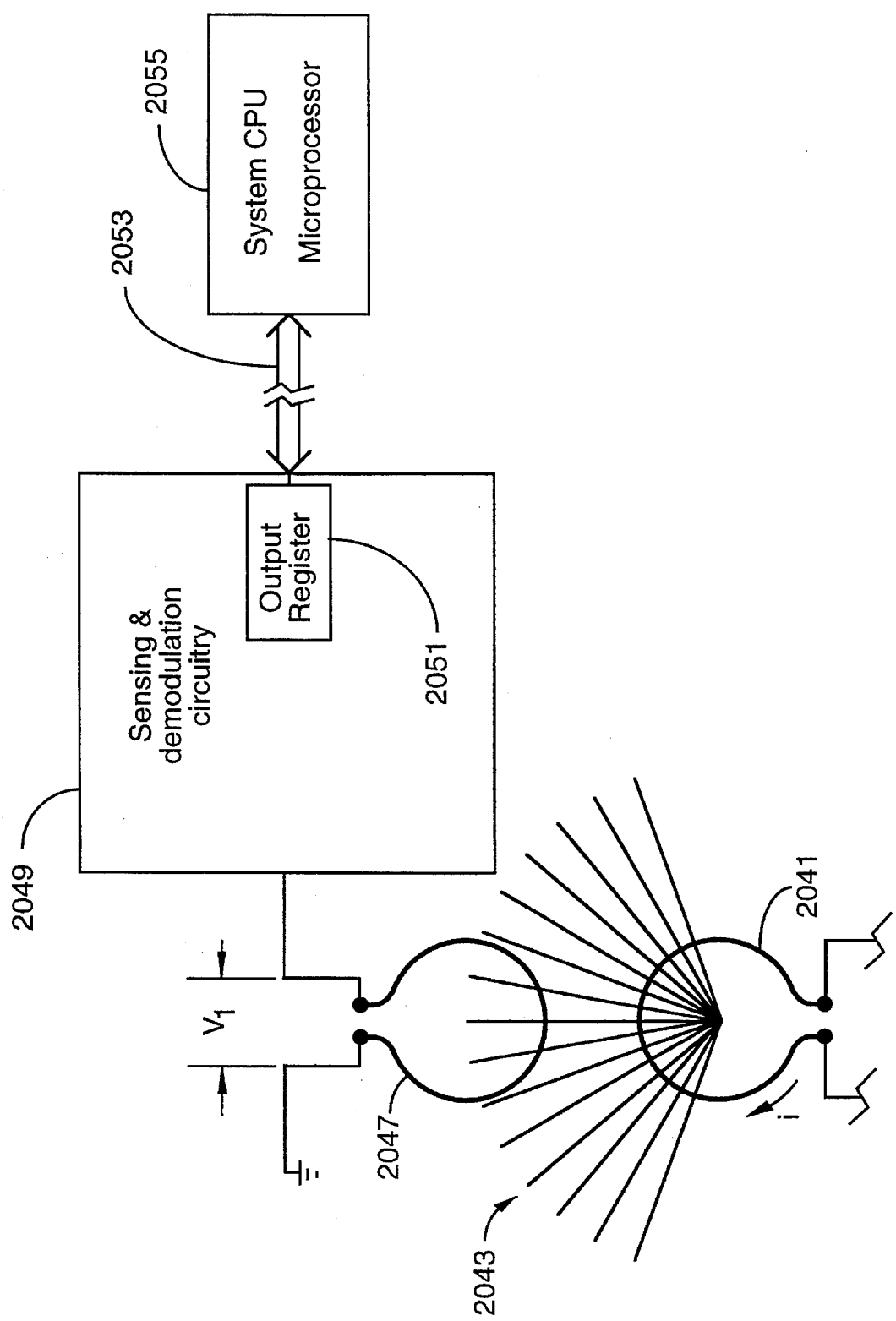
FIG. 31 illustrates a receiver and demodulation circuitry for receiving magnetically encoded scan codes and reconstructing the associated digital scan codes therefrom.

FIG. 31 shows generating loop 2041 of FIG. 30 and a receiving unit 2045 located in housing 2017. Receiving unit 2045 provides the function of the special I/O port that receives scan codes by serial cable for a conventional system, and forwards the codes to the system CPU. In one embodiment receiving unit 2045 is implemented as an add-in card for a general-purpose computer, but in other embodiments, the receiving unit is a hard-wired unit in the computer housing. The latter is the preferred case for notebook, laptop, and other computers meant to be highly portable.

In the present invention information about keystrokes is transmitted to the system CPU via encoded magnetic fluctuations in field 2043. Toward this end unit 2045 has a receiving loop 2047 for intercepting the magnetic field produced by loop 2041. As is well known in field theory, there will be no effect in loop 2047 unless there is a change in the strength of the magnetic field. To transmit information, then, it is necessary that the magnetic field be either expanding or collapsing.

As is known in the art of electrical engineering, there exists a defined property between two electrical circuits called mutual inductance. The mutual inductance determines the emf induced in one circuit as a consequence of a change in current in another. The direction of the emf in the one is, of course, a property of the current direction in the other.

In the embodiment of the present invention shown by FIGS. 30 and 31, a current i produced in loop 2041 produces an emf $V_1$ in loop 2 by virtue of the change in magnetic field 2043 produced by the change in the current in loop 2047 from 0 to i (and from i to 0). To produce a detectable emf change across the ends of loop 2047, current controller 2035, driven by microprocessor 2025 (FIG. 2) creates a finite burst of current in loop 2041. As this current goes from 0 to i, a positive emf is produced in loop 2047, and as the current in loop 2041 drops back to 0, the emf magnitude in loop 2047 changes to a negative value. The change in emf in the invention affords the ability to transmit scan codes.

It is empirically known and reflected in the concept of mutual inductance that the magnitude if the emf produced in one circuit by a current change in another is proportional to the rate of change of current with respect to time in the one, that is di/dt. Accordingly, the cross section of the transmitting loop is relatively large so as to not present an impediment of high resistance to a rapid rise of current as a result of imposing a voltage on the transmitting loop. In the present embodiment of the invention the transmitting loop is made of square conductor about 2 millimeters on a side and with a mean diameter of about 25 millimeters.

In the embodiment shown, the current for the transmitting loop and for other operations of the keyboard is provided by battery-based power supply 2039. It is desirable therefore that the power requirements for the keyboard be kept to a minimum level. Nevertheless, it is also desirable to operate in a manner to avoid corruption of transmissions with spurious signals caused by ambient magnetic fields, due to current levels in other circuitry of the keyboard, the computer elements in housing 2017, or other equipment that may be in the vicinity of the computer system according to the invention. In the described embodiment current in the transmitting loop is limited to several milliamps, and interference is handled at the receiving unit rather than by higher power requirements for the transmitter.

The induced emf in receiving loop 2047 is monitored by sensing and demodulation circuitry 2049 in the receiving unit according to control routines implemented as part of the system BIOS preferably, and an output register 2051 is set up with received scan codes transmitted from the keyboard. As in a conventional demodulator, when a scan code is "ready" unit 2049 issues an interrupt via I/O bus 2053 to system CPU 2055 that a scan code is available to be read. After a received scan code is read by the system CPU, the output register is reset for the next scan code received.

FIG. 32A is an exemplary trace of a received emf waveform 2057 ($V_1$ across the ends of loop 2047) as a result of managing i in transmitting coil 2041 according to a pre-programmed code protocol. FIG. 32B shows a serial bit pattern 2058 developed as a result of monitoring the received emf waveform.

In the transmission protocol of the embodiment exemplified by FIGS. 32A and 32B, as in a typical serial protocol, there is a pre-programmed bit time, (bt) 2063 which is the reciprocal of the transmission rate (sometimes called the Baud rate). This bit time for scan code transmission need not tax the clock rate of most systems. For example, a very modest ten megahertz clock rate has a period of $10^{-7}$ seconds. Assuming, for example, a bit time of 1000 times the clock period and twelve bit times minimum to transmit-one scan code, the code may be transmitted in $1.2\times10^{-3}$ seconds. Few people type that fast.

In the present example, the protocol consists of emf spikes across the ends of the receiving loop produced by current bursts in the transmitting loop. Keyboard microprocessor 2025 (FIG. 2) reads the keystrokes, both make and break and key combinations, and sends the scan codes in serial bursts timed according to the bit time. Each current burst in loop 2041 produces a spike such as spike 2059 in loop 2047 which spans about one-fourth of a bit time (this time may vary widely within the bit time).

The scan codes in the present embodiment are the conventional scan codes for U.S. IBM compatible keyboards as referenced above, but there are many alternative codes that might be used in other embodiments.

In FIG. 32A a code start signal is provided by three spikes 2061 timed at twice the bit time rate. Circuitry 2049 (FIG. 31) recognizes the code start signal and monitors the next eight bit times for spikes as indicative of data bits, setting an output register 2051 according to the bits sensed. A bit time with a definite spike is a logical one, and a bit time with no spike produces a logical zero. After the eight bits are transmitted, the transmitter issues a stop code 2065 of five spikes at twice the bit rate, and looks for another start signal. There are a wide variety of start and stop codes (signals) that might be employed in different coding schemes within the scope of the invention, and the means described is but one of the many.

The scan code transmitted in the example of FIG. 32B, 00101101, is hex 2D, which is the make code for the "x" key according to the protocol used in the preferred embodiment, which is the conventional scan codes used by most IBM compatible computer keyboard systems. As a user types on the keyboard the system according to the invention continues to interpret the key makes and breaks, and the key combinations used, and sends the scan codes to the computer via the transmission loop and the receiving loop.

It will be apparent to one with the skill in the art that there are many changes that might be made and many other combinations that might be made without departing from the spirit and scope of the invention. There are, for example, many ways to implement the support structure of the μPDA, and to interconnect the active components. One way has been illustrated by FIG. 2 and described in accompanying text. There are many alternatives to this preferred structure. There is also a broad range of sizes and form factors that might be assumed by devices according to the present invention. The use of well-known PCMCIA form factors has been disclosed, but other sizes and forms might also be provided in alternative embodiments. In larger embodiments, on-board peripherals may be implemented.

In addition to these alternatives, there are various ways the connectivity of a μPDA bus might be provided. The well-known PCMCIA standard has been disclosed as a preference, but other connectivity may also be used in alternative embodiments. Memory types and sizes may vary. Means of providing a security code may vary. The nature of the internal bus may vary. One alternative for a two-part keyboard integrated with a μPDA is described in some detail, along with inductive coupling technology for communication between the μPDA and the keyboard. There are indeed many variations that do not depart from the spirit and scope of the invention.

What is claimed is:

1. A digital assistant system comprising:
   an enclosure;
   a CPU within the enclosure;
   a memory coupled to the CPU;
   a video display coupled to and operable by the CPU, implemented on a surface of the enclosure; and
   a keyboard separate from the enclosure;
   wherein the keyboard comprises:
   a first keyboard portion having a first group of keys electrically connected to a first portion of an electrical connector;
   a second keyboard portion having a second group of keys electrically connected to a second portion of the electrical connector;
   a controller electrically connected for monitoring keystrokes and managing operations of the keyboard;
   a magnetic field generator in the second keyboard portion connected to the controller for generating a variable magnetic field; and
   a power supply in the second keyboard portion connected for supplying electrical power to power-using elements of the keyboard;
   wherein the first and second keyboard portions joined by the electrical connector form a contiguous keyboard, and wherein the power supply, controller, keys, and magnetic field generator are electrically interconnected with the controller, and the controller is adapted to drive the magnetic field generator to code keystrokes as variations in the variable magnetic field generated by the magnetic field generator.

2. A digital assistant system as in claim 1 additionally comprising an expansion bus interface comprising an expansion bus connected to the CPU and to a first portion of an expansion bus connector implemented on a surface of the enclosure.

3. A digital assistant system as in claim 1 additionally comprising a nonvolatile storage device connected to the CPU and containing a code unique to the digital assistant system, for uniquely identifying the digital assistant system to connecting digital devices.

4. A digital assistant system as in claim 3 wherein the nonvolatile storage device is an EEPROM device.

5. A digital assistant system as in claim 1 further comprising a user-accessible well having electrical connections for a storage battery for powering functional elements of the digital assistant system.

6. A digital assistant system as in claim 1 further comprising a solar energy conversion panel having electrical connections for attaching to and recharging a storage battery.

7. A digital assistant system as in claim 1 wherein the video display comprises an LCD display.

8. A digital assistant system as in claim 1 further comprising a pointer device for providing positional and directional input for control operations performed in conjunction with the video display.

9. A digital assistant system as in claim 1 further comprising a host interface bus coupled to the CPU and to a first portion of a host interface connector at a surface of the enclosure, the host interface bus providing address lines, data lines, and control signal lines, control signals on the control signal lines including read/write and at least one memory control signal, but no interrupt request (IRQ) signal or IRQ signal line.

* * * * *